US012561993B2

(12) United States Patent
Zhang et al.

(10) Patent No.: US 12,561,993 B2
(45) Date of Patent: Feb. 24, 2026

(54) ANALYSIS OF HISTOPATHOLOGY SAMPLES

(71) Applicant: The Institute of Cancer Research: Royal Cancer Hospital, London (GB)

(72) Inventors: Hanyun Zhang, London (GB); Yinyin Yuan, London (GB)

(73) Assignee: The Institute of Cancer Research: Royal Cancer Hospital, London (GB)

( * ) Notice: Subject to any disclaimer, the term of this patent is extended or adjusted under 35 U.S.C. 154(b) by 298 days.

(21) Appl. No.: 18/289,299

(22) PCT Filed: May 4, 2022

(86) PCT No.: PCT/EP2022/061941
§ 371 (c)(1),
(2) Date: Nov. 2, 2023

(87) PCT Pub. No.: WO2022/233916
PCT Pub. Date: Nov. 10, 2022

(65) Prior Publication Data
US 2024/0233416 A1      Jul. 11, 2024

(30) Foreign Application Priority Data

May 5, 2021    (GB) ..................................... 2106397

(51) Int. Cl.
*G06K 9/00*          (2022.01)
*G06V 10/74*         (2022.01)
(Continued)

(52) U.S. Cl.
CPC .......... *G06V 20/698* (2022.01); *G06V 10/761* (2022.01); *G06V 10/772* (2022.01);
(Continued)

(58) Field of Classification Search
None
See application file for complete search history.

(56) References Cited

U.S. PATENT DOCUMENTS

2021/0118136 A1      4/2021   Hassan-Shafique et al.
2022/0139072 A1*    5/2022   Klaiman ............ G06V 10/7747
                                                                        382/159

OTHER PUBLICATIONS

Hradel et al., "Interpretable diagnosis of breast cancer from histological images using Siamese neural networks" (Year: 2020).*
(Continued)

*Primary Examiner* — SJ Park
(74) *Attorney, Agent, or Firm* — Klarquist Sparkman, LLP

(57) ABSTRACT

Methods and systems for analysing the cellular composition of a sample are described, comprising: providing an image of the sample in which a plurality of cellular populations are associated with respective signals and classifying a plurality of query cells in the image between a plurality of classes corresponding to respective cellular populations in the plurality of cellular populations. This is performed by providing a query single cell image to an encoder module of a machine learning model to produce a feature vector for the query image, and assigning the query cell to one of the plurality of classes based on the feature vector for the query image and feature vectors produced by the encoder module for each of a plurality of reference single cell images. The machine leaning model comprises: the encoder module, configured to take as input a single cell image and to produce as output a feature vector the single cell image, and a similarity module configured to take as input a pair of feature vectors for a pair of single cell images and to produce as output a score indicative of the similarity between the single cell images. Thus, the machine learning model can be obtained without the need for an extensively annotated dataset. The methods
(Continued)

find use in the analysis of multiplex immunohistochemistry/ immunofluorescence in a variety of clinical contexts.

20 Claims, 14 Drawing Sheets

(51) Int. Cl.

| | |
|---|---|
| *G06V 10/772* | (2022.01) |
| *G06V 10/774* | (2022.01) |
| *G06V 10/82* | (2022.01) |
| *G06V 20/69* | (2022.01) |

(52) U.S. Cl.
CPC ............ *G06V 10/774* (2022.01); *G06V 10/82* (2022.01); *G06V 2201/03* (2022.01)

(56)               References Cited

OTHER PUBLICATIONS

Yarlagadda et al. "A system for one-shot learning of cervical cancer cell classification in histopathology images" (Year: 2019).*

Abduljabbar et al., "Geospatial Immune Variability Illuminates Differential Evolution of Lung Adenocarcinoma," *Nature Medicine*, vol. 26, pp. 1054-1062, Jul. 2020.

Abousamra et al., "Weakly-Supervised Deep Stain Decomposition for Multiple IHC Images," *IEEE 17th International Symposium on Biomedical Imaging*, pp. 481-485, Apr. 3-7, 2020.

Bankhead et al., "QuPath: Open Source Software for Digital Pathology Image Analysis," *Scientific Reports*, 7:16878, Dec. 2017 (7 pages).

Bindea et al., "Spatiotemporal Dynamics of Intratumoral Immune Cells Reveal the Immune Landscape in Human Cancer," *Immunity*, vol. 39, pp. 782-795, Oct. 2013.

Bromley et al., "Signature Verification Using a "Siamese" Time Delay Neural Network," *Advances in Neural Information Processing Systems 6*, pp. 737-744, 1993.

Chang et al., "LIBSVM: A Library for Support Vector Machines," *ACM Transactions on Intelligent Systems and Technology*, 2:27, 2011 (40 pages).

Chen et al., "A Simple Frankwork for Contrastive Learning of Visual Representations," *37th International Conference on Machine Learning*, 2020 (20 pages).

Fassler et al., "Deep Learning-based Image Analysis Methods for Brightfield-Acquired Multiplex Immunohistochemistry Images," *Diagnostic Pathology*, 15:100, 2020 (15 pages).

Galon et al., "Type, Density, and Location of Immune Cells Within Human Colorectal Tumors Predict Clinical Outcome," *Science*, vol. 313, pp. 1960-1964, Sep. 29, 2006.

Gerdes et al., "Highly Multiplexed Single-Cell Analysis of Formalin-Fixed, Paraffin-Embedded Cancer Tissue," *PNAS*, vol. 110, p. 11982-11987, Jul. 16, 2013.

Giesen et al., "Highly Multiplexed Imaging of Tumor Tissues with Subcellular Resolution by Mass Cytometry," *Nature Methods*, vol. 11, pp. 417-425, Apr. 2014.

Hagos et al., "ConCORDe-Net: Cell Count Regularized Convolutional Neural Network for Cell Detection in Multiplex Immunohistochemistry Images," *International Conference on Medical Image Computing and Computer-Assisted Intervention 2019 (MICCAI 2019)*, Aug. 1, 2019 (9 pages).

Ma et al., "Data Integration from Pathology Slides for Quantitative Imaging of Multiple Cell Types Within the Tumor Immune Cell Infiltrate," *Diagnostic Pathology*, 12:69, 2017 (12 pages).

Nalepa et al., "Selecting Training Sets for Support Vector Machines: A Review," *Artificial Intelligence Review*, vol. 52, pp. 857-900, 2019.

Narayanan et al., "Unmasking the Immune Microecology of Ductal Carcinoma in Situ with Deep Learning," *NPJ Breast Cancer*, 7:19, 2021 (14 pages).

Perkin Elmer, "User's Manual for Nuance 3.0.2," 2010 (132 pages).

Raza et al., "Deconvolving Convolutional Neural Network for Cell Detection," *IEEE 16th International Symposium on Biomedical Imaging*, pp. 891-894, Apr. 8- 11, 2019.

Sirinukunwattana et al., "Locality Sensitive Deep Learning for Detection and Classification of Nuclei in Routine Colon Cancer Histology Images", *IEEE Transactions on Medical Imaging*, vol. 35, pp. 1196-1206, May 2016.

Tan et al., "Overview of Multiplex Immunohistochemistry/ Immunofluorescence Techniques in the Era of Cancer Immunotherapy," *Cancer Communications*, vol. 40. pp. 135-153, Apr. 2020.

Tamborero et al., "A Pan-cancer Landscape of Interactions between Solid Tumors and Infiltrating Immune Cell Populations," *Clin. Cancer Res.*, vol. 24, pp. 3717-3728, Aug. 2018.

Tirosh et al., "Dissecting the multicellular ecosystem of metastatic melanoma by single-cell RNA-seq," *Science*, vol. 352, pp. 189-196, Apr. 2016 (Author manuscript version, 23 pages).

Tsyurmasto et al., "Value-at-Risk Support Vector Machine: Stability to Outliers," *Journal of Combinatorial Optimization*, vol. 28, pp. 218-232, Dec. 2013.

Gildenblat et al., "Self-Supervised Similarity Learning for Digital Pathology," *arXiv*, pp. 1-9, May 20, 2019, downloaded Jan. 13, 2020.

Intellectual Property Office Search Report dated Feb. 9, 2022, issued for GB 2106397.9 (2 pages).

International Search Report and Written Opinion dated Aug. 5, 2022, issued for PCT/EP2022/061941 (18 pages).

Medela et al., "Few Shot Learning in Histopathological Images: Reducing the Need of Labeled Data on Biological Datasets," *2019 IEEE 16th International Symposium on Biomedical Imaging*, pp. 1860-1864, Apr. 8-11, 2019.

Yang et al., "Liver Histopathological Image Retrieval Based on Deep Metric Learning," *2019 IEEE International Conference on Bioinformatics and Biomedicine*, pp. 914-919, 2019.

Yarlagadda et al., "A System for One-Shot Learning of Cervical Cancer Cell Classification in Histopathology Images," *Progress in BioMedical Optics and Imaging*, vol. 10956, 2019 (6 pages).

* cited by examiner

| Dataset | Total annotations | Cost of time | No. of cell types | Accuracy |
|---|---|---|---|---|
| LUSC B cell | 13545 | ~19 hours | 6 | 0.89 |
| ER- breast cancer | 20477 | ~28 hours | 5 | 0.96 |

A

B

A

B

C

D

ANALYSIS OF HISTOPATHOLOGY SAMPLES

CROSS REFERENCE TO RELATED APPLICATIONS

This is the U.S. National Stage of International Application No. PCT/EP2022/061941, filed May 4, 2022, which was published in English under PCT Article 21 (2), which in turn claims the benefit of Great Britain Application No. 2106397.9, filed May 5, 2021, which is incorporated herein in its entirety.

FIELD OF THE INVENTION

The present invention relates to the analysis of cells or tissue samples, such as histopathology samples. In particular, the present invention relates to methods of analysing the cellular composition of samples by identifying and classifying single cells in an image of a sample between a plurality of cell type classes.

BACKGROUND

Recent advance in single-cell sequencing reveals heterogeneous cell populations distinct in phenotypes and functional states within human tissues and tumour microenvironment [1]. The abundance and spatial location of cell subsets have been associated with prognosis and response to therapies, highlighting the urgent need to inspect the cellular component in the spatial context to better understand their roles during disease progression [2]-[4]. Rapid development of multiplexed imaging techniques such as multiplexed immunohistochemistry (mIHC), multiplexed immunofluorescence (mIF) and imaging mass cytometry (IMC) have enabled the spatial distribution of transcripts and proteins to be mapped in situ [5]-[7].

A common task following the multiplexed imaging is to identify specific cell types marked by staining of antibodies. Manual annotation of individual cells by trained pathologists is not practical at any meaningful scale. Thus, automated tools for cell identification have been developed. Existing automated tools for cell identification either use unsupervised algorithms to cluster cells based on the colour combinations observed, or employ supervised deep learning models using pathologist annotations as training events. Supervised learning generally has better accuracy than unsupervised learning thanks to a high specificity in the definition of the labels. However, supervised learning is extremely time consuming and limited by the availability of annotations. Unsupervised learning uses training data that is significantly easier to obtain and does not have the same annotation burden, but the predictions have high uncertainty and the clustering is prone to bias by irrelevant features. In particular, unsupervised methods such as colour decomposition have been proposed, but these are limited to 4-6 colour channels, usually rely on specialized instrumentation [8], [9] or are specific to a single panel of markers [10]. For example, proposed to use an autoencoder trained on weak annotations to predict the colour concentration of each pixel for segmenting multiple stains on mIHC, which is highly specific for the designed panel. On the other hand, supervised deep learning approach have been able to overcome the limitation of colour combinations and to identify cell class meaningful for research and clinical diagnosis, but requires a very high amount of manual labels to achieve the desired performance [11].

Thus, despite these advances in cell identification in histopathology images, there is a lack of accurate, generalizable and scalable approaches to analyse pathological sections at the single cell level.

SUMMARY OF THE INVENTION

The present inventors have devised a machine learning-based quantitative approach for single cell detection and classification in pathology slides, requiring minimal human input for training and deployment. In particular, the approach requires a level of human input for training and development that is drastically lower than that required by the prior art supervised machine learning approaches. The approach is universally applicable to single cell detection and classification in images of pathology slides that have been stained with labels, such as labelled antibodies, including in particular cases where multiple cell populations are labelled with a plurality of labels and/or combination of labels (such as e.g. multiple immunohistochemistry/multiplex immunofluorescence slides). The method addresses the need for automating the single cell annotation of pathology images, both at the deployment phase and at the training phase, as the latter still imposes a significant burden that has to be incurred every time conventional supervised machine learning based methods are trained to perform a different type of pathology analysis. Briefly, this is achieved at least in part by: providing a machine learning model that is trained to compare similar and dissimilar single cell images, which are automatically obtained, then using that information to facilitate the classification task using a small set of reference single cell images representative of the single cell classes to be identified.

In other words, the inventors have postulated that it may be possible to imply intrinsic features from the unlabelled data to facilitate the supervised task. Thus, they devised a new deep learning pipeline based on the hypothesis that a network could be trained to differentiate similar and dissimilar images without external class labels, with the hope that the features learnt in this self-supervised manner can benefit the cell identification task. They further demonstrated its capability to distinguish cell types from multiplex IHC slides with minimal human inputs.

Accordingly, an aspect of the invention provides a method of analysing the cellular composition of a sample, the method comprising: providing an image of the sample in which a plurality of cellular populations are associated with respective signals; and classifying a plurality of query cells in the image between a plurality of classes comprising one or more classes corresponding to respective cellular populations in the plurality of cellular populations. Classifying a plurality of query cells in the image comprises, for each query cell: providing a query single cell image to an encoder module of a machine learning model to produce a feature vector for the query image; and assigning the query cell to one of the plurality of classes based on the feature vector for the query single cell image and feature vectors produced by the encoder module for each of a plurality of reference single cell images comprising at least one reference single cell image for each of the plurality of cellular populations. The machine leaning model comprises: the encoder module, wherein the encoder module is configured to take as input a single cell image and to produce as output a feature vector the single cell image, and a similarity module configured to take as input a pair of feature vectors for a pair of single cell images and to produce as output a score indicative of the similarity between the single cell images.

Thus, the task of classifying single cells between a plurality of cellular population classes is performed using a machine learning model that only needs to be able to produce a score that is indicative of the similarity between single cell images, rather than to classify single cells between a plurality of cell classes. Such a machine learning model is not trained using information regarding the classification of single cells between the plurality of cell classes, and as such does not require an extensively annotated training dataset in which each single cell is assigned to one of the plurality of cell classes to be distinguished. Instead, the machine learning model can be trained using training data comprising images of single cells that are considered similar (also referred to herein as "positive pairs"), and images of single cells that are considered different (also referred to herein as "negative pairs"). Such a training dataset can be obtained automatically, thereby greatly reducing the annotation burden and increasing the applicability of the method compared to known supervised approaches to analyse the cellular composition of samples.

The image of the sample in which a plurality of cellular populations are associated with respective signals typically shows a substantial proportion of the sample, and may therefore be referred to as a "whole slide image" (by reference to pathology samples being commonly supported on a solid surface called a slide, for staining (if applicable) and imaging).

The method may further comprise providing a reference set of single cell images comprising at least one reference single cell image for each of the plurality of cellular populations. The method may further comprise providing each of the reference single cell images in turn to the encoder of the machine learning model to produce a feature vector for each reference single cell image.

The similarity module may take as input a pair of feature vectors for a pair of single cell images each received directly from the encoder module. The encoder module may comprise a pair of encoders each of which produces as output a feature vector for a single cell image. In other words, the encoder module may be configured to take as input a pair of single cell images and to produce as output a feature vector for each image in the pair of single cell images. The pair of encoders may be identical.

The machine learning model may have been trained using a set of training single cell images comprising: a plurality of pairs of single cell images that each show at least a portion of the same cell (positive pairs), and a plurality of pairs of single cell images that each show at least a portion of a different cell (negative pairs), wherein the two images in a pair are different from each other.

Thus, the machine learning model can be trained to distinguish images of the same cell from images of different cells. This does not require any human input and in particular any knowledge of the cellular identity of the cells. Such a machine learning model can be trained to output a relatively high score for positive pairs and a relatively low score for negative pairs. In other words, the positive pairs may be associated with first label (e.g., 1) and the negative pairs may be associated with a second label (e.g. 2), and the machine learning model may be trained to correctly assign the first label to the positive pairs and the second label to the negative pairs, where the error in the assignment may be quantified using any loss function known in the art.

A set of training single cell images may have been obtained by: providing a plurality of single cell images; obtaining a plurality of sub-patches from each single cell image, wherein a sub-patch is an image that comprises a portion of the single cell image; and obtaining a plurality of positive pairs of single cell images by pairing sub-patches from the same single cell image, and a plurality of negative pairs of single cell images by pairing sub-patches from different single cell images. The method may comprise obtaining a set of training single cell images.

The term "patch" refers to a portion of an image of a sample. Within the context of the present disclosure, the term "patch" is used to refer to a portion of an image (e.g. a portion of a whole slide image) that (primarily) shows a single cell. Thus, the term is used interchangeably with the term "single cell image". A single cell image or patch is typically obtained by cropping a larger image so as to obtain a smaller image that primarily shows a single cell (i.e. an image that is such that the majority of the surface of the image is expected to show a single cell). As the skilled person understands, a single cell image or patch may in practice show a portion of a single cell, or portions of multiple single cells, depending for example on the respective shape, size and density of the cells in an image. As an example, in very densely packed regions of a sample it may be difficult or impossible to obtain a single cell image that does not show additional portions of neighbouring cells in addition to the primary cell in the patch. As another example, some cells may be larger along at least one dimension than is typically expected for the single cells in the image, and as such a single cell image of such cell may not show the entirety of the surface of the cell. Within the context of the present invention, a single cell image or patch typically has a fixed size. For example, all query single cell images may have the same size, and this may be the same size as the single cell images in the reference dataset.

The term "sub-patch" refers to a portion of a patch/single cell image. Within the context of the present invention, a sub-patch typically has a fixed size. For example, the sub-patches may have a fixed size that corresponds to the input size expected by the machine learning model. As a particular example, a single cell image may be an image of 28 by 28 pixels (and a number of channels dependent on the situation, such as e.g. the number and identity of the labels used), and a sub-patch may be an image of 20 by 20 pixels (with the same number of channels as the corresponding single cell images).

The use of sub-patches from single cell images to form the pairs of images used to train the machine learning model encourages the model to learn position invariant features. This increases the robustness of the predictions from the network, mimicking a trained pathologist's ability to recognise cellular features of interest in an image of a cell regardless of the precise location of the feature in the image. For example, a pathologist would be able to identify a cell whether the cell is perfectly centred in the field that they are looking at, or not, regardless of the precise orientation of the cell (e.g. cells that have an asymmetrical morphology), etc. By contrast, many image recognition algorithms are very sensitive to the respective location and orientation of structures in the images being analysed.

In any embodiments where sub-patches are used, the number of sub-patches per single cell image may be fixed, for a particular sample. The number of sub-patches per single cell image is, in principle, not limited. Thus, any number of sub-patches that is such that all sub-patches derived from a single cell image are different from each other may be used. Preferably, a set of sub-patches derived from a single cell image together encompass all pixels of the single cell image. For example, the sub-patches may be generated by applying a crop mask to the single cell images with a stride of p pixels, where p can be chosen depending on the size of the single cell images and the desired number of sub-patches. For example, applying a crop mask of 20 by 20 pixels with a stride of 4 pixels to a single cell image of 28 by 28 pixels will result in the generation of 9 sub-patches. The choice of a suitable number of sub-patches may depend on the available computational resources and the performance of the method in a particular context, which can be assessed using a training dataset and any classification performance metric known in the art such as e.g. accuracy, precision, recall etc. The inventors have found the use of approximately 9 sub-patches per single cell image to work well in many contexts.

The score provided by the machine learning model may be interpreted as indicative of the likelihood that a pair of images show the same single cell (high score) vs different single cells (low score). For example, the machine learning model may provide a score between 0 and 1, which may be interpreted as the probability that a pair of input images show the same single cell.

Assigning the query cell to one of the plurality of classes based on the feature vector for the query single cell image and feature vectors produced by the encoder module for each of a plurality of reference single cell images may comprise: assigning the query cell to one of the plurality of classes using a classifier model trained to classify the feature vectors produced by the encoder module for each of the plurality of reference single cell images between classes corresponding to the plurality of cellular populations. The classifier model may be a support vector machine, a k-nearest neighbour classifier, a neural network, a decision tree classifier, or a naïve bayes classifier. Preferably, the classifier is a support vector machine classifier. The classifier may comprise a support vector machine trained to separate feature vectors from single cell images into classes corresponding to the plurality of cellular populations by identifying a hyperplane that best separates the feature vectors from the reference images that correspond to different cellular populations in the plurality of cellular populations.

Assigning the query cell to one of the plurality of classes based on the feature vector for the query single cell image and feature vectors produced by the encoder module for each of a plurality of reference single cell images may comprise: providing the feature vector for the query image and the feature vectors for each the plurality of reference single cell images in turn to the similarity module, thereby obtaining a plurality of scores indicative of the similarity between the query single cell image and each of the respective reference single cell image; and assigning the query cell to one of the plurality of classes based on the plurality of scores. Assigning the query cell to one of the plurality of classes based on the plurality of scores may comprise assigning the query cell to the class that is associated with the reference single cell image that is predicted to be most similar to the query single cell image. The reference single cell image that is predicted to be most similar to the query single cell image may be the reference single cell image of the reference set of single cell images that is associated with the highest score predicted by the machine learning model (amongst the reference set). This may be useful when the score predicted by the machine learning model is a score that is higher for more similar images than for less similar images (such as e.g. a score between 0 and 1, 0 indicating low similarity and 1 indicating high similarity).

Classifying a query cell between a plurality of classes may comprise obtaining a plurality of sub-patches from the query single cell image. Providing a query single cell image to the encoder module of the machine learning model may comprises providing a sub-patch from the query single cell image to the encoder module of the machine learning model.

The feature vectors produced by the encoder module for each of a plurality of reference single cell images may comprise feature vectors produced for one or more of a plurality of sub-patches from each reference single cell image. Such an approach may be particularly advantageous when the machine learning model has been trained using sub-patches from single cell images. Indeed, this will mean that the machine learning model is optimally able to analyse such images. Additionally, the sub-patches used as inputs to analyse a query cell may then be associated with the same size input tensor for the machine learning model. Thus, it is advantageous for the size (where the size of an image may refer in particular to the amount of data in the image, in terms of e.g. number of pixels and channels) of the sub-patches used in the training and the classification of a query cell to be the same.

Alternatively, it is also possible for a machine learning model trained using sub-patches of single cell images to be used to analyse single cell images of a different size, although in such cases the single cell images may be re-sized before being provided as inputs to the machine learning model in order to be associated with an input tensor of the size expected by the machine learning model (i.e. the size used in the training phase). This may be performed by cropping (in which case the resizing may be equivalent to obtaining a sub-patch) or by interpolation.

Assigning the query cell to one of the plurality of classes based on the feature vector for the query image and feature vectors produced by the encoder module for each of a plurality of reference single cell images may comprise: for each distinct pair comprising a sub-patch from the query single cell image and a sub-patch from the reference single cell image, providing the feature vector for the sub-patch for the query image and the sub-patch from the reference single cell image to the similarity module. The score indicative of the similarity between the query single cell image and the respective reference single cell image may comprise a score predicted by the machine learning model for each distinct pair. Assigning the query cell to one of the plurality of classes based on the plurality of scores may comprise assigning the query cell to the class that is associated with the reference single cell image that comprises the sub-patch that was predicted to have the highest similarity with a sub-patch from the query single cell image.

Classifying a query cell between a plurality of classes may comprise obtaining a representative sub-patch from the query single cell image. Providing a query single cell image to the encoder module of the machine learning model may comprise providing the representative sub-patch from the query single cell image to the encoder module.

The feature vectors produced by the encoder module for each of a plurality of reference single cell images may comprise feature vectors produced for a representative sub-patch from each reference single cell image. The respective representative sub-patches may be the central sub-patches of the respective single cell images. Thus, in such embodiments, assigning the query cell to the class that is associated with the reference single cell image that comprises the sub-patch that was predicted to have the highest similarity with a sub-patch from the query single cell image may comprise assigning the query cell to the class that is associated with the reference single cell image whose representative patch (e.g. central patch) is predicted by the machine learning model to be most similar to the representative patch of the query single cell image. For example, this may be the representative patch for which the score predicted by the similarity module was the highest.

The reference patch may be the central patch. The central patch is the patch that is centred on the centre of the single cell image. The reference patch may be a patch that does not include any border pixels of the single cell image. Border pixels are the columns and rows of pixels that are most external to an image (i.e. the pixels that are located along the inner perimeter of the image). The border pixels may comprise a plurality of rows and columns around the inner perimeter of an image (e.g. a border of e.g. one, two, three, etc. pixels width along the inner perimeter of the image may form the border region comprising the pixels. The width of the border region may be determined based on the size of the image. For example, the width of the border region may be chosen such that the border region does not exceed 20%, 15%, 10% of the image. The central patch may be a patch that is centred on the centre of the single cell image and that does not include any border pixel of the single cell image. Such embodiments may be advantageous in that the step of classifying a query cell, when performed using the similarity module, is computationally efficient, only requiring a single image per query cell to be compared per image in the reference set (i.e. a total of $N_r{}^*N_q$ comparisons/predictions/evaluations of the machine learning model, where $N_r$ is the number of reference images and $N_q$ is the number of query cells). Such embodiments may also be advantageous in that the reference patch may be chosen so as to reduce the likelihood of the classification step (whether using the similarity module, a classifier or any other approach based on the feature vectors) being influenced by border effects such as e.g. portions of neighbouring cells that may be visible within a single cell image. This may be particularly the case when a central patch or any patch that does not include any of the border pixels is used.

The reference single cell image that comprises the sub-patch that was predicted to have the highest similarity with a sub-patch from the query single cell image is the reference single cell image comprising the sub-patch that is predicted to be most similar to any sub-patch of the query single cell image. In other words, all distinct pairs of sub-patches from the query image and each reference image may be associated with a score using the machine learning model, and the pair with the highest score is used to assign the query image to the class of the reference image from which the sub-patch was produced. Such an approach may be advantageous in view of uncertainty in relation to the location of the cells within a single cell image (such as e.g. uncertainty as to whether each single cell image is centred on the centre of the cell). However, compared to the use of a reference patch, this method is more computationally intensive when using the similarity module for classification (in particular requiring $n^2{}^*N_r{}^*N_q$, where n is the number of sub-patches obtained for each single cell image) and may be more influenced by border effects. This may be particularly the case where signals are strong in peripheral regions of cells—e.g. where strong distinctive signals can be seen in peripheral regions of at least some of the plurality of cell populations, and weaker signals may be present in the central region of at least others of the plurality of cell populations (e.g. where some cellular populations are characterised by strong distinctive membrane or cytoplasmic signals whereas others are characterised by weaker or less distinctive nuclear or cytoplasmic signals).

Assigning the query cell to one of the plurality of classes based on the feature vector for the query image and feature vectors produced by the encoder module for each of a plurality of reference single cell images may comprise: assigning the query cell to one of the plurality of classes using a classifier model trained to classify the feature vectors produced by the encoder module for each of the plurality of reference single cell images between classes corresponding to the plurality of cellular populations, wherein the feature vectors used by the classifier for each single cell image comprise feature vectors produced by the encoder module for each of the plurality of sub-patches for the single cell image.

Classifying a plurality of query cells in the image between the plurality of classes may comprise: for each distinct pair of reference single cell images, providing the feature vector for the reference cell images to the similarity module of the machine learning model, thereby obtaining a plurality of scores indicative of the similarity between the reference cell images in the respective pairs; and assigning the query cell to one of the plurality of classes based on: the plurality of scores indicative of the similarity between the query single cell image and each of the respective reference single cell images, and the plurality of scores indicative of the similarity between the reference cell images in the respective pairs. The method may further comprise obtaining a plurality of sub-patches for each of the reference images (as described above), obtaining a feature vector for each of the plurality of sub-patches for each of the reference images (as described above), and providing the feature vector for the reference cell images to the similarity module of the machine learning model may comprise providing feature vectors for the respective sub-patches of the reference images to the similarity module. Providing feature vectors for the reference cell images to the similarity module of the machine learning model may comprise providing respective reference sub-patches for each reference single cell image (e.g. the central patches), or providing respective pairs of sub-patches, as explained above.

Assigning the query cell to one of the plurality of classes may comprise quantifying a similarity metric between the plurality of scores indicative of the similarity between the query single cell image and the respective reference single cell image and the corresponding plurality of scores indicative of the similarity between the reference cell images in the respective pairs. A query cell may be assigned to the class that is associated with the similarity metric indicative of highest similarity. This may be the highest value, for example when the similarity metric is a similarity score. Alternatively, this may be the lowest value, for example when the similarity metric is a distance. A distance metric may be convenient, such as for example the L1 (Manhattan) or L2 (Euclidian) distance. The L1 distance may be particularly convenient as it is computationally efficient while increasing with decreasing similarity. In other words, a query single cell may be assigned to the class of the reference single cell image whose pattern of similarity to single cell images in other classes (as assessed using the entire single cell images, a single sub-patch of the images or a plurality of sub-patches for each image) is most similar that of the query single cell image, where similarity between patterns of similarities can be quantified as e.g. the distance between vectors of similarity scores. As a simple example, consider a query image Q and reference images R1 (class 1), R2 (class 2) and R3 (class 3). Image Q may be compared to each of reference images R1, R2, and R3, generating a score or a plurality of scores (where multiple pairs of sub-patches are use) for each Q-R comparison. Each of images reference images R1, R2, and R3, may be compared to the other reference images, generating a score or a plurality of scores (where multiple pairs of sub-patches are use) for each R-R comparison. The results of the Q-R comparisons may then be compared to the results of the R-R comparisons as follows: compare:

the vector comprising the results of {Q-R2, Q-R3} to the vector comprising the results of {R1-R2, R1-R3}— this provides an indication of similarity between Q and R1;

the vector comprising the results of {Q-R1, Q-R3} to the vector comprising the results of {R2-R1, R2-R3}— this provides an indication of similarity between Q and R2;

the vector comprising the results of {Q-R1, Q-R2} to the vector comprising the results of {R3-R1, R3-R2}— this provides an indication of similarity between Q and R3.

Each of these comparisons may be obtained as a metric of similarity between these vectors, e.g. a distance. The most similar pair of vector is that associated with the class that is most similar to the query cell. This approach may advantageously be robust to uncertainty in relation to the location of the cells within the single cell images and to border effects. However, the approach may be computationally intensive, particularly when all sub-patches comparisons are performed (in which case a total of up to $n^2*N_r*N_r+n^2*N_r*N_q+N_r*N_q$ runs of the machine learning model may be performed). The inventors have found that different methods of assigning the query cell to one of the plurality of classes based on the plurality of scores, as described herein, may be beneficial depending on the circumstances, such as e.g. the features of the single cell images, the cellular populations to be distinguished, and the computational power available. Thus, the inventors have found it useful to use a training dataset with characteristics similar to a sample to be analysed to evaluate one or more of these methods and identify that which has the best performance in the circumstances. The best performance may be assessed using any classification evaluation metric known in the art such as accuracy, precision, recall, etc. possibly in combination with speed/ computational efficiency considerations if applicable.

Classifying at least a subset of the cells in the image may comprise obtaining a plurality of query single cell images using a machine learning model trained to locate single cells in an image. Such machine learning models are known in the art and include supervised models such as spatially constrained convolutional neural networks (such as e.g. the method described in Sirinukunwattana et al.) and unsupervised methods (such as e.g. the method described in Bankhead et al.).

The reference set of single cell images comprises between 1 and 5 reference single cell images for each of the plurality of cellular populations. The present inventors have found that the method was able to accurately classify single cells using as few as one (preferably two) reference single cell images. The number of reference single cell images may be chosen depending on the variety of morphologies (where the term "morphology" can cover both shape of the signal associated with the cells as well as intensities and mixture of signals across a plurality of channels) that are expected within a cellular population. For example, where the cells within a population can exhibit a wider range of morphologies, the performance of the method may be increased by including a plurality of reference single cell images that capture this range of morphologies. The number of reference single cell images for each of the plurality of cellular populations may be chosen depending on the expected proportions of cells in the plurality of cellular populations in the image of the sample. For example, a cellular population that is expected to be highly represented in an image of the sample may be associated with a larger number of reference single cell images than a cellular population that is expected to be represented to a lower extent in the image of the sample.

The reference set of single cell images may comprise at least one image corresponding to background signal. The use of an "empty patch" category (also referred to herein as "empty image", or "background" category) in the reference set of single cell images may improve the accuracy of the method especially when the query single cell images (and/or the training single cell images) are obtained using a method that produces false positive single cell images. Indeed, many automated single cell location methods tend to "over-identify" single cells, wrongly identifying background signal as indicative of the presence of a cell. The use of an "empty patch" category in the reference dataset means that query single cell images can be assigned to this category when they are most similar to background signal, thereby automatically removing these erroneously identified single cell patches.

The method may further comprise providing a reference set of single cell images. Providing a reference set of single cell images may comprise receiving one or more reference images from a user and/or obtaining one or more references images form a data store. The reference images may be received from a user, for example through a user interface. For example, obtaining a reference set of single cell images may comprise receiving from a user, through a user interface, a selection of one or more single cell images from a whole slide image or a plurality of whole slide images, each selected single cell image corresponding to one of the plurality of cellular populations or to an empty patch. Obtaining a reference set of single cell images may further comprise receiving from the user an indication of the cellular population with which each reference image is associated. Obtaining a reference set of single cell images may instead or in addition comprise prompting a user to select one or more single cell images corresponding to one of the plurality of cellular populations or to an empty patch, and recording the user's selected image(s) and an association with the one of the plurality of cellular populations or an empty patch label.

The reference set of single cell images may have been expanded by: providing an initial reference set of single cell images; using the initial reference set of single cell images and the trained machine learning model to classify a plurality of query single cell images; for each class of cells, selecting one or more query single cell images that are most dissimilar to any of the reference single cell images from the same class; and obtaining a label for each selected query single cell image including them in an updated reference set of single cell images. The method may comprise providing an initial reference set of single cell images and expanding the initial reference set into the reference set of single cell images by: using the initial reference set of single cell images and the trained machine learning model to classify a plurality of query single cell images; for each class of cells, selecting one or more query single cell images that are most dissimilar to any of the reference single cell images from the same class; and obtaining a label for each selected query single cell image including them in an updated reference set of single cell images. The query single cell images that are most dissimilar to any of the reference single cell images from the same class may be selected using a criterion that applies on a distance between the feature vectors for the query single cell images and the feature vectors for the reference single cell images. Any query single cell image that satisfies the criterion may be selected, such as for example the query single cell image with the maximum distance, the x (where x can be 1, 2, 3, etc.) query single cell images with the highest distances, etc. For example, the query single cell image with the maximum Manhattan distance to any of the reference cells from the same class K may be selected. The query single cell images that are most dissimilar to any of the reference single cell images from the same class may be selected using a criterion that applies on the similarity score between the query single cell images and the reference single cell images. For example, the query single cell image(s) with the lowest similarity score(s) may be selected. The process may be repeated at least once, each iteration resulting in an updated reference set of single cell images from the updated reference set of single cell images obtained at the previous iteration. The process may be repeated a number of times. The process may be repeated until a criterion has been met. For example, the process may be repeated until a score computed on a testing set (e.g. the F1-score) no longer improves.

The machine learning model may have been trained using a set of training single cell images obtained by receiving a selection of one or more regions of interest in one or more images of samples and obtaining training single cell images from the one or more regions of interest.

The region(s) of interest preferably comprises a plurality of cells from each of the plurality of cellular populations to be identified. Obtaining training single cell images from the one or more regions of interest may be performed using a machine learning model trained to locate single cells in an image, such as e.g. supervised models such as spatially constrained convolutional neural networks (such as e.g. the method described in Sirinukunwattana et al.) and unsupervised methods (such as e.g. the method described in Bankhead et al.). The regions of interest may be received from a user, for example through a user interface. For example, obtaining one or more regions of interest may comprise receiving from a user, through a user interface, a selection of one or more regions from a whole slide image or a plurality of whole slide images. The regions of interest may be obtained automatically, such as e.g. using an automated image analysis method configured to identify regions with high cell density and/or signal variability and/or intensity. The regions of interest may be obtained automatically using a colour deconvolution method to (roughly) unmix stains on the slide, then compute the concentration of pixels with stain intensities above a certain threshold within a window sliding over the whole slide. Regions with a high diversity of stain compositions may then be selected as regions of interest. These may be used for cell identification and training. Examples of suitable colour deconvolution methods are described in [16]. For example, in section 'Color deconvolution and spectral unmixing' of [16], two approaches for stain unmixing are described. The first approach comprised separating each RGB image into stain-specific channels based on manually defined RGB components for each stain. The second approach used the inForm™ software, taking spectral data of the image as input. Either of these approaches may be used herein.

The machine learning model may have been trained using a loss function that weighs positive pairs more than negative pairs. A loss function that weights positive pairs more than negative pairs may comprise any function the output of which is more influenced by its inputs for positive pairs than by its inputs for negative pairs. Downplaying the influence of negative pairs compared to positive pairs in the training of the machine learning model may be advantageous when negative pairs may contain single cell images of cells that are different but that belong to the same cellular population. This may be the case e.g. when no further filter is applied to the selection of negative pairs (other than the criterion on the images in a negative pair showing different cells). Indeed, the presence of such negative pairs may be detrimental to the model's ability to learn features of similarity between cells that are also relevant to similarity between classes. For example, the respective weights applied to positive and negative pairs may be between 95-5% and 55-45%, between 90-10% and 60-40%, or between 80-20 and 60-40%, such as approximately 70-30%. A suitable ratio of weights for positive and negative pairs, as well as a suitable loss function amongst those known in the art (such as e.g. the binary cross-entropy) may be chosen using a suitable training dataset. The loss function may comprise a loss function that uses the output of the similarity module (i.e. similarity scores). Such a function may be weighted (for example to weigh positive pairs more than negative pairs) or unweighted. For example, the loss function may comprise a weighted binary cross-entropy loss function. The loss function may comprise a loss function that uses the output of the encoder module. For example, the loss function may use a similarity metric between the features provided by the encoder module for two single cell images in a pair. Such a function may weigh positive pairs more than negative pairs. For example, the loss function may comprise a normalized temperature-scaled cross entropy loss (NT-XEnt). The loss function may comprise one or more loss functions that use the output of the similarity module, and one or more loss functions that use the output of the encoder module. The plurality of loss functions may be summed. For example, a combined loss function may be used with is the sum of a loss function that use the output of the similarity module (such as a weighted binary cross-entropy loss function), and one or more loss functions that use the output of the encoder module (such as a normalized temperature-scaled cross entropy loss).

A set of training single cell images may have been obtained by: obtaining a plurality of single cell images; and pairing the single cell images, for example randomly. Pairing the single cell images may comprise clustering the single cell images and only including pairs of single cell images that fall within different clusters (or conversely excluding any pair of single cell images that fall within the same cluster). This may advantageously reduce the potential negative impact of negative pairs comprising cells from the same cellular population. The step of clustering may comprise using a pre-trained machine learning model (e.g. an autoencoder or any other type of machine learning model, preferably an artificial neural network, that can be used to learn image features in an unsupervised manner) to extract image features, and clustering the image features. The image features may be clustered using any clustering technique known in the art, such as k-means clustering.

The machine learning model may comprise a deep learning model. The machine learning model may comprise a Siamese neural network. The machine learning model advantageously comprises a deep leaning model in the encoder module. For example, the encoder may be or comprise a deep learning model, such as a deep artificial neural network, for example a convolutional neural network. Siamese neural networks are a cell of artificial neural network that comprises two parallel encoders that use the same weights to compute comparable output vectors from two different input vectors. Preferably, the machine learning model comprises two identical encoders (each taking as input a single cell image) (part of the encoder module), and a single branch (part of the similarity module) that takes as input the combined output of the two encoders and generates as output the score indicative of similarity between the two input images. The single branch (similarity module) may take as input the concatenated output of the two encoders. The single branch may comprise one or more (such as all) of the following layers: a dense layer, a linear activation layer, a batch normalisation layer, a Relu activation layer, and a Sigmoid activation layer. A Sigmoid activation layer may advantageously produce an output that is bounded between 0 and 1, and can therefore be interpreted as a pair-wise similarity between two images, with 0 representing no similarity and 1 representing the highest similarity. The encoders of the encoder module may comprise one or more of the following layers: a convolution layer, a batch normalisation layer, a Relu activation layer, a max pooling layer, a flattening layer, a dense layer, and a regularisation layer (e.g. dropout layer). The present inventors have found relatively simple networks to be advantageous as they avoid overfitting. For example, the present inventors have found a machine learning model comprising a Siamese network as described above, comprising approximately 14k parameters to be suitable.

The image of the sample and/or any training images may each be selected from immunohistochemistry and immunofluorescence images. In other words, the plurality of cellular populations in the sample may be associated with respective signals in the image through the use of immunohistochemistry or immunofluorescence markers (also referred to herein as labels). Each of the plurality of cellular population may be associated with a respective label or combination of labels that is represented in the image. In other words, each cellular population may be advantageously associated with a unique combination of labels, where each label is associated with a signal that can be distinguished from the signal associated with any other label. For example, each label may be a fluorescent label that emits in a different wavelength range (or can be captured in a separate image channel from other labels, such as by virtue of using a different absorption wavelength range), and each population of cell may be associated with a different combination of one or more fluorescent labels. Of note, the combination of labels may at least partially overlap between two or more populations of cells. For example, population 1 may be associated with label 1, and population 2 may be associated with labels 1 and 2. This is equivalent to no two cellular populations being distinguishable solely by the intensity of the same signal. Indeed, the present inventors have found that the method performed better when the plurality of cellular populations to be identified were each associated with different labels, as this allowed to train a machine learning model with a relatively simple architecture that both accurately and robustly classified cells between these populations. Cellular populations that are distinguishable solely by the intensity of a signal ay be distinguishable using more complex machine learning models (e.g. using a deep learning model that has a more complex architecture, for example a Siamese network with more complex parallel encoder branches). Thus, the present method could also be applied to such cases. However, this may be accompanied with enhanced overfitting problems. Further, many pathologists believe that signal intensity cannot be used as a reliable indicator of cellular identity. Therefore, these more complex methods may not produce results that are directly comparable to the assessment made by a trained expert on manual inspection. Additionally, in any embodiment of the invention, where the intensity of a signal may be informative, a measure of this intensity of a signal associated with a query cell may be obtained based on the similarity between the query single cell image and a reference image of a single cell associated with the signal. This may be useful, for example where one or more subpopulations of cells may exist that may be associated with different staining intensities. For example, all query cells showing a signal associated with label L1 may be classified in the class associated with label L1, but the distribution of similarity scores within these query cells may reveal multiple sub-populations of query cells associated with different levels of intensity of the signal associated with label L1.

Providing an image of the sample may comprise receiving an image from a user interface, a data store or an image acquisition means. The method may further comprise any of the steps of: obtaining the sample, processing the sample for imaging (including e.g. any of fixing, labelling, storing, etc.), and imaging the sample. The single cell images may be multicolour images. For example, each image may be an RGB image. Providing a single cell image or reference single cell image may comprise normalising the intensity values in the image. For example, each channel (e.g. each channel in a RGB image) may be normalised between 0 and 1.

The method may further comprise determining the amounts, ratios, proportions or spatial distribution of cells in the sample belonging to one or more of the plurality of cellular populations using the number of query cells assigned to the respective classes corresponding to the one or more of the plurality of cellular populations. In the simplest case, the number of query cells assigned to a class may be used as representative of the amount of single cells in the sample belonging to the corresponding cellular population. Similarly, these numbers can be used to obtain corresponding proportions, and ratios of any two cellular populations of interest. Alternatively, these numbers can be used to derive a corresponding amount, ratio or proportion by extrapolation, for example based on the expected proportion of the sample that has been captured in the query cells. Determining the spatial distribution of cells belonging to one or more of the plurality of cellular populations may comprise determining one or more of: the relative location of cells in two different ones of the plurality of cellular populations, the spatial concentration of cells in one or more of the plurality of cellular populations, the tissue location of cells in one or more of the plurality of cellular populations.

A further aspect of the present invention provides a method of providing a diagnostic and/or prognostic for a subject, the method comprising analysing the cellular composition of a sample from the subject using the method of any embodiment of the first aspect, wherein the cellular composition of the sample is indicative of a diagnostic and/or prognostic. Analysing the cellular composition of a sample may comprise determining the amounts, ratios or proportions of cells in the sample belonging to one or more of a plurality of populations by classifying a plurality of query cells in an image of the sample between a plurality of classes comprising one or more classes corresponding to respective cellular populations in the plurality of cellular populations, using the method of the preceding aspect.

According to a third aspect, there is provided a method of providing a tool for analysing the cellular composition of a sample, the method comprising: providing a plurality of training single cell images; providing a machine learning model configured to take as input a pair of images and to produce as output a score indicative of the similarity between the images; and training the machine learning model to take as input a pair of single cell images and to produce as output a score indicative of the similarity between the single cell images. Training the machine learning model may comprise training the model to associate a first label and/or a high score to positive pairs of training single cell images and a second label and/or a low score to negative pairs of training single cell images, wherein positive pairs comprise pairs of distinct single cell images that each show at least a portion of the same cell (positive pairs), and negative pairs comprises pairs of distinct single cell images that each show at least a portion of a different cell. The method of the present aspect may comprise any of the features of the method of the first aspect. In particular, the machine leaning model may comprise: an encoder module configured to take as input a single cell image and to produce as output a feature vector the single cell image, and a similarity module configured to take as input a pair of feature vectors for a pair of single cell images and to produce as output a score indicative of the similarity between the single cell images. The method may further comprise recording the parameters of the trained machine learning model. The method may further comprise providing the trained machine learning model to a user. The method may further comprise providing a classifier model configured to classify a feature vector produced by the encoder module between classes corresponding to a plurality of cellular populations, and training the classifier module using a set of reference single cell images comprising at least one image associated with each of the plurality of cellular populations.

According to a fourth aspect, there is provided a method comprising any of the steps of the first aspect and any of the steps of the third aspect. Any of the methods described herein may be computer-implemented.

According to a fifth aspect, there is provided a system for analysing the cellular composition of a sample, the system including: at least one processor; and at least one non-transitory computer readable medium containing instructions that, when executed by the at least one processor, cause the at least one processor to perform operations comprising: providing an image of the sample in which a plurality of cellular populations are associated with respective signals; and classifying a plurality of query cells in the image between a plurality of classes comprising one or more classes corresponding to respective cellular populations in the plurality of cellular populations. Classifying a plurality of query cells in the image comprises, for each query cell: providing a query single cell image to an encoder module of a machine learning model to produce a feature vector for the query image; and assigning the query cell to one of the plurality of classes based on the feature vector for the query single cell image and feature vectors produced by the encoder module for each of a plurality of reference single cell images comprising at least one reference single cell image for each of the plurality of cellular populations. The machine leaning model comprises: the encoder module, wherein the encoder module is configured to take as input a single cell image and to produce as output a feature vector the single cell image, and a similarity module configured to take as input a pair of feature vectors for a pair of single cell images and to produce as output a score indicative of the similarity between the single cell images.

The system according to the present aspect may be configured to implement the method of any embodiment of the first, second and/or third aspect. In particular, the at least one non-transitory computer readable medium may contain instructions that, when executed by the at least one processor, cause the at least one processor to perform operations comprising any of the operations described in relation to the first, second and/or third aspect.

According to a sixth aspect, there is provided a system for providing a tool for analysing the cellular composition of a sample, the system including: at least one processor; and at least one non-transitory computer readable medium containing instructions that, when executed by the at least one processor, cause the at least one processor to perform the steps of any embodiment of the third aspect. The method may comprise any of the features of the second aspect.

According to an seventh aspect, there is provided a non-transitory computer readable medium comprising instructions that, when executed by at least one processor, cause the at least one processor to perform the method of any embodiment of the first, second or third aspect.

According to an eighth aspect, there is provided a computer program comprising code which, when the code is executed on a computer, causes the computer to perform the method of any embodiment of the first, second or third aspect.

DETAILED DESCRIPTION OF THE INVENTION

Figure 1:
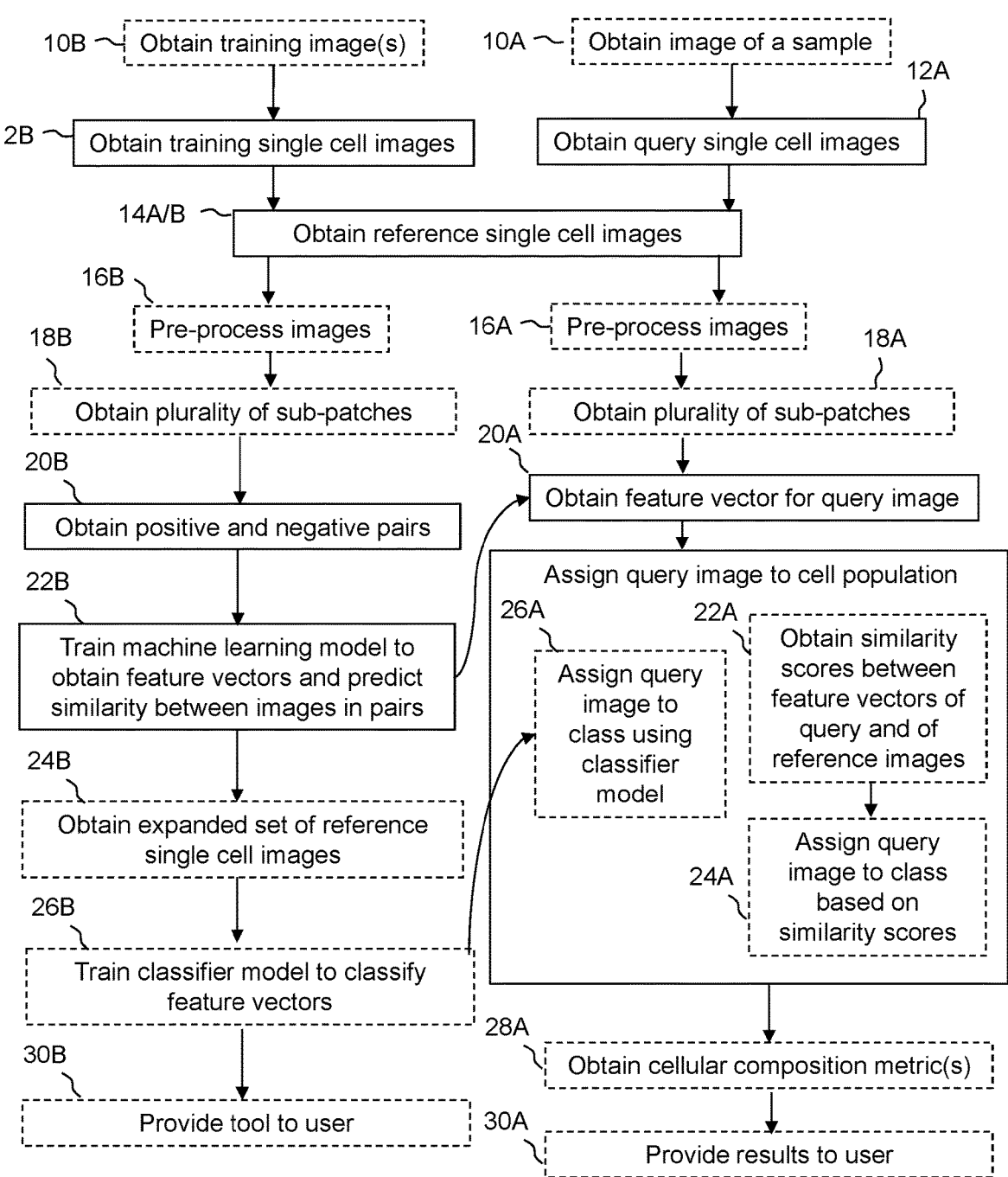
FIG. 1 is a flowchart illustrating schematically a method of analysing the cellular composition of a sample and/or of providing a tool for analysing the cellular composition of a sample, according to the disclosure.

Certain aspects and embodiments of the invention will now be illustrated by way of example and with reference to the figures described above.

In describing the present invention, the following terms will be employed, and are intended to be defined as indicated below.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

A "sample" as used herein may be a cell or tissue sample (e.g. a biopsy), from which histopathology images can be obtained, typically after fixation and/or labelling. The sample may be a cell or tissue sample that has been obtained from a subject. In particular, the sample may be a tumour sample. The sample may be one which has been freshly obtained from a subject or may be one which has been processed and/or stored prior to making a determination (e.g. frozen, fixed or subjected to one or more purification, enrichment or labelling steps). Alternatively, the sample may be a cell or tissue culture sample. As such, a sample as described herein may refer to any type of sample comprising cells. The sample may be a eukaryotic cell sample or a prokaryotic cell sample. A eukaryotic cell sample may be a mammalian sample, such as a human or mouse sample. Further, the sample may be transported and/or stored, and collection may take place at a location remote from the sample processing location (e.g. labelling, fixation etc.), and/or the image data acquisition location. Further, the computer-implemented method steps may take place at a location remote from the sample collection and/or processing location(s) and/or remote from the image data acquisition location. For example, the computer-implemented method steps may be performed by means of a networked computer, such as by means of a "cloud" provider.

A sample may be a (histo)pathology sample, for example a pathological section or biopsy. A pathological section or biopsy may be a tumour section or biopsy. A tumour section may be a whole-tumour section. A whole-tumour section is typically a section cut from a surgically resected tumour, thus representing the characteristics of the whole tumour. Thus, a whole-tumour section may be a surgically resected section. A pathological sample may be a biopsy obtained from a tumour. The pathological sample is preferably stained. Staining facilitates morphological analysis of tumour sections by colouring cells, subcellular structures and organelles. Any type of staining that facilitates morphological analysis may be used. The pathology sample may be stained with hematoxylin and eosin (H&E). H&E stain is the most commonly used stain in histopathology for medical diagnosis, particularly for the analysis of biopsy sections of suspected cancers by pathologists. Thus H&E stained pathological samples are usually readily available as part of large datasets collated for the study of cancer. The pathology sample is preferably further stained using one or more labels that are associated with specific cellular markers of interest. A common way to associate a label with a cellular marker is through the use of labelled affinity reagents, such as labelled antibodies. Thus, the cellular markers of interest may also be referred to as "antigens". The labels may be detectable through a chromogenic reaction, where the affinity reagent is conjugated to an enzyme (e.g. a peroxidase) that can catalyse a colour-producing reaction. Alternatively, the labels may be detected through fluorescence, where the affinity reagent is associated with a fluorophore (such as e.g. fluorescein or rhodamine). The latter may be referred to as immunofluorescence. The former may be referred to as chromogenic immunohistochemistry, or simply immunohistochemistry. The term "immunohistochemistry" is commonly used as an umbrella term to encompass detection via chromogenic immunohistochemistry and via immunofluorescence. The methods of the present invention are particularly useful when multiple cellular markers of interest are detected for the same sample, for example to identify and/or quantify different cell populations or sub-populations. Such approaches can be referred to as "multiplex immunohistochemistry".

The cellular markers may be chosen to be indicative of cell types of interest present in the sample. For example, immune markers may be used to label various types of immune cells such as B cells and T cells, and their subtypes. Examples of common cellular markers used in immunohistochemistry include CD3 (a T cell co-receptor that activates cytotoxic T cells and T helper cells and is commonly used as a marker to identify T-cell lymphomas), CD4 (a glycoprotein found on the surface of immune cells such as T helper cells, monocytes, macrophages, and dendritic cells), CD8 (a T cell co-receptor primarily expressed on the surface of cytotoxic T cells), CD10 (a zinc-dependent metalloprotease expressed by hematopoietic progenitors, used to identify e.g. renal cell carcinoma and acute lymphoblastic leukemia), CD20 (a transmembrane protein expressed on the surface of B-cells and used to identify B-cell lymphomas), CD117 (a tyrosine kinase receptor used to identify gastrointestinal stromal tumours (GIST) and mast cell tumours), FOXP3 (a transcriptional regulator associated with regulatory T cells), PD1 (a cell surface receptor expressed on T cells and pro-B cells), cytokeratins (epithelial cytoskeleton proteins used to identify carcinomas), members of the signal transducer and activator of transcription (STAT) protein family, Galectin-8 (Gal8, a marker of endosomal disruption), and many others.

As used herein, the terms "computer system" includes the hardware, software and data storage devices for embodying a system or carrying out a method according to the above described embodiments. For example, a computer system may comprise a central processing unit (CPU), input means, output means and data storage, which may be embodied as one or more connected computing devices. Preferably the computer system has a display or comprises a computing device that has a display to provide a visual output display (for example in the design of the business process). The data storage may comprise RAM, disk drives or other computer readable media. The computer system may include a plurality of computing devices connected by a network and able to communicate with each other over that network. It is explicitly envisaged that computer system may consist of or comprise a cloud computer.

As used herein, the term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

As the skilled person understands, the complexity of the operations described herein (due at least to the amount of data that is analysed and the complexity of the machine learning models used) are such that they are beyond the reach of a mental activity. Thus, unless context indicates otherwise (e.g. where sample preparation or acquisition steps are described), all steps of the methods described herein are computer implemented.

Figure 3:
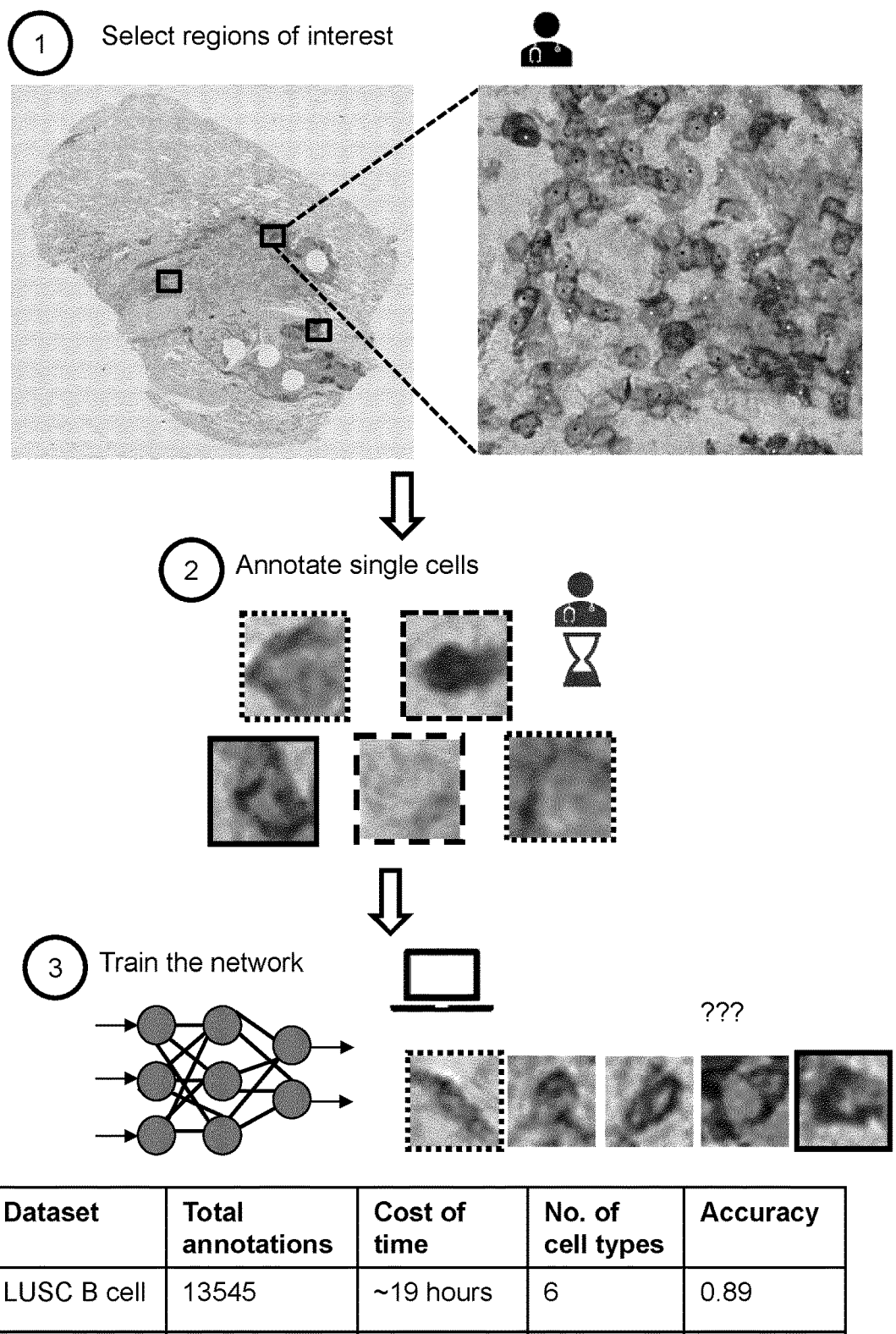
FIG. 3 illustrates schematically a comparative method for analysing pathology samples based on training a deep learning network using training data comprising expert annotated single cells.

FIG. 3 illustrates schematically a comparative method for analysing pathology samples based on training a deep learning network using training data comprising expert annotated single cells. A pathology sample may have been stained using one or more labels associated with cellular markers of interest. The stained sample may have been imaged, typically producing a multicolour image when multiple markers are used (each colour being indicative of the presence of a marker of interest). Such an image may be referred to as a "whole slide image" (WSI). A WSI typically shows a great number of cells, and would be impractical to analyse manually in its entirety. Thus, a trained pathologist may select one or more regions of interest (step 1 on FIG. 3). For the purpose of training a machine learning model for identification of single cells from a plurality of cellular subtypes associated with different markers (i.e. classification of cells between cellular subtype classes), region(s) of interest may suitably be chosen as region(s) that includes cells representative of each of the plurality of cellular subtypes to be identified. This step is typically relatively fast. Then, a trained pathologist may use a software to select and annotate single cells in each region of interest, assigning a class label to each identified single cell (step 2 on FIG. 3, where different borders indicate different cell classes associated with the single cell images). This step is extremely time consuming and requires a trained expert in order to obtain data with the necessary accuracy to train a machine learning model to replicate this process automatically. As illustrated on FIG. 3, this is further complicated by the fact that it is frequently difficult to distinguish cell classes in such images, with many cases not clearly belonging to a single class. The annotations can then be used to train a machine learning model (typically a deep learning model) to classify single cells between the classes represented in the training data (step 3 of FIG. 3). The table on FIG. 3 provides an estimate of the amount of time required to annotate cells from two exemplary datasets, as well as an estimate of the accuracy that can be obtained by training a typical AI model (such as a spatially constrained convolutional neural network, SCCNN) using the annotations as training data. The amount and quality of the training data annotations influence the performance of the machine learning model, and models that have similar performance to manual expert annotation typically require very extensive training data (sometimes of to tens of thousands of annotated single cells). Additionally, the entire process has to be repeated for every combination of labels and cell types (in practice, every time a new type of sample or a new panel of markers is used).

By contrast, the present invention provides a self-supervised training approach where a machine learning model can be trained to identify single cells without requiring training data comprising single cell class annotations. Thus, the method accelerates the development of tools for automated analysis of single cells in image data by minimising the amount of manually obtained training data required, while maintain a similar level of performance. Further, the method has a wide range of applications particularly within the field of digital pathology.

The approach taken in the present invention, of identifying single cells using a self-supervised approach, contrasts with previous approaches to analyse pathology samples, including automated (machine learning-based) unsupervised and supervised approaches. As previously mentioned, supervised approaches to single cell identification require a very large amount of training data, including hundreds to thousands of manually annotated cells for each cellular population to be identified, in each specific context (type of sample, populations to be analysed and labels used), requiring dozens of hours of expert time. By contrast, the present approach involves at most manual selection of a handful of reference single cell images (e.g. 1 or 2 reference images per cellular population are sufficient in many cases; for the classification phase), and of one or more regions of interest showing a diverse range of cells representative of the cells to be identified (in the training phase; a task that takes seconds and can even be automated).

The issue of the annotation burden associated with the training of supervised machine learning models for the analysis of pathology images has been recognised previously. The use of a self-supervised method for feature extraction by similarity learning has been previously suggested by Gildenblat and Klaiman (2020, *Self-Supervised Similarity Learning for Digital Pathology*. arXiv: 1905.08139) in the context of analysing whole slide images to identify tumour and non-tumour regions. In this work, the authors proposed to exploit the spatial continuity of whole slide pathology images at the region level by training a Siamese network using a predetermined maximum distance between pairs of tiles labelled as similar, and a predetermined minimum distance between pairs of tiles to be labelled as similar. The approach is unsuitable for the analysis of single cells as opposed to entire regions within tissues, because the fundamental underlying assumption of image spatial continuity does not apply to the single cell scale. Indeed, cell distribution within tissue is highly heterogeneous in both types and density. Additionally, the approach is strictly limited to two types of regions. By contrast, the present invention is specifically designed to identify and classify single cells, without requiring any arbitrary definition of similarity/dissimilarity to be imposed (thereby being fully automated and generalizable), and is able to handle multiplex stains and multiclass problems.

Analysing Pathology Images

The present disclosure provides method for analysing the cellular composition of a sample and/or for providing a tool for analysing the cellular composition of a sample, such as e.g. a (histo)pathology sample, using image data from the sample. An illustrative method will be described by reference to FIG. 1. On FIG. 1, two branches are shown, branch A comprises steps performed in analysing the cellular composition of a sample, and branch B comprises steps performed in providing a tool for analysing the cellular composition of a sample. Branches A and B may each be performed independently, or may both be performed. In other words, branch B is optional in a method of analysing the cellular composition of a sample, and branch A is optional in a method of providing a tool for analysing the cellular composition of a sample.

At step 10A, an image of a sample, such as a histopathology sample is obtained. The image shows an may be a immunohistochemistry or immunofluorescence image. The image may be received from a user interface, a data store or an image acquisition means. The image may be a multicolour image such as an RGB image. The image shows a plurality of cellular populations each associated with respective signals. Each of the plurality of cellular population may be associated with a respective label or combination of labels that is represented in the image. At step 10B, a training image or sets of images is obtained. The training image(s) may have the same features as the query image described in relation to step 10A. In particular, the training image(s) may show a plurality of cellular populations each associated with respective signals, where the plurality of cellular populations comprise the plurality of cellular populations to be analysed on the image obtained at step 10A. For example, for the purpose of analysing a sample for populations A, B, C and D associated with markers a, b, ac and bd, respectively, a tool that has been trained using training images that show populations A, B, C and D associated with markers a, b, ac and bd, respectively, may be used.

At step 12A, a plurality of query single cell images are obtained from the image of the sample. These may be obtained, for example, using a machine learning model trained to locate single cells in an image. Such machine learning models are known in the art and include supervised models such as spatially constrained convolutional neural networks (such as e.g. the method described in Sirinukunwattana et al.) and unsupervised methods (such as e.g. the method described in Bankhead et al.). A plurality of training single cell images may similarly be obtained at step 12B. Step 12B may optionally further comprise receiving a selection of one or more regions of interest in the training image(s) and the training single cell images may be obtained from the one or more regions of interest. The region(s) of interest may be selected such that they comprises a plurality of cells from each of the plurality of cellular populations to be identified. The region(s) of interest may be received from a user, for example through a user interface. Instead or in addition to this, one or more regions of interest may be obtained automatically, such as e.g. using an automated image analysis method configured to identify regions with high cell density and/or signal variability and/or intensity.

At step 14A/B, a reference set of single cell images comprising at least one reference single cell image for each of the plurality of cellular populations is provided. The reference single cell images are each labelled with a particular cell class. In other words, the reference single cell images are each associated with one of the plurality of cellular populations (or a background class, as explained below, if used). Alternatively, in branch A a feature vector associated with each of a reference set of single cell images may be provided. The reference feature vectors may have been obtained by providing each of the reference single cell images in turn to the encoder of the machine learning model which will be described further below, to produce a feature vector for each reference single cell image. The reference set of single cell images may comprise between 1 and 5 reference single cell images for each of the plurality of cellular populations. The reference set of single cell images or the corresponding feature vectors may be received from a user interface, or a data store. The reference set of single cell images may have been selected manually (e.g. by a user through a user interface). For example, the reference set of single cell images may be chosen to be representative of the respective cellular populations, and may be chosen to represent the variety of morphologies (where the term "morphology" can cover both shape of the signal associated with the cells as well as intensities and mixture of signals across a plurality of channels) that are expected within a cellular population. The reference set of single cell images advantageously comprises at least one image corresponding to background signal. Step 14A is optional and may not be performed, depending on how the query single cell image is classified at steps 22A-24A, 26A below. In particular, where steps 22A-24A are not used, step 14A may not eb performed.

The reference set of single cell images used in branch A may be the same as the reference set of single cell images used in branch B, as illustrated by the common box in the flowchart.

The single cell images (whether reference or query) may be referred to as "patches" or "single cell patches".

At step 16A, the plurality of query single cell images and the reference set of single cell images are optionally pre-processed. Pre-processing may include normalising the intensity values in each image. For example, each channel (e.g. each channel in a RGB image) may be normalised between 0 and 1. This step may alternatively be performed on the original image of the sample, prior to obtaining the query single cell images. The plurality of training single cell images and reference single cell images may similarly be pre-processed at step 16B.

At step 18A, a plurality of sub-patches are obtained for each of the plurality of query single cell images and the reference set of single cell images. The term "sub-patch" refers to a portion of a patch/single cell image. Within the context of the present invention, a sub-patch typically has a fixed size. For example, a fixed number of sub-patches of fixed size may be obtained for every single cell image. This may be obtained for example by applying a crop mask of fixed size to each single cell image of fixed size. The crop mask may be applied according to a predetermined scheme, such as for example covering the image with a fixed stride. A plurality of sub-patches are similarly obtained for each of the plurality of training single cell images and the reference set of single cell images at step 18B.

At step 20B, a plurality of pairs of single cell images that each show at least a portion of the same cell (positive pairs), and a plurality of pairs of single cell images that each show at least a portion of a different cell (negative pairs), are obtained, wherein the two images in a pair are different from each other. The plurality of positive pairs of single cell images are obtained by pairing sub-patches from the same training single cell image, and the plurality of negative pairs of single cell images are obtained by pairing sub-patches from different single cell images. At least two different strategies may be used for this step. A first strategy comprises generating N random pairs of training single cell images, then generating, for each of the N pairs, n random positive pairs and n random negative pairs. A second strategy comprises generating N random pairs of training single cell images, then selecting N random sub-patches for negative pairs and N random sub-patches for positive pairs. Any other strategy for generating positive and negative pairs using sub-patches from single cell images may be used. Generating N random pairs of training single cell images may comprise clustering the training single cell images and only including pairs of training single cell images that fall within different clusters (or conversely excluding any pair of single cell images that fall within the same cluster). This may advantageously reduce the risk of negative pairs of single cell images comprising single cells that are different cells but from the same population of cells.

At step 22B, a machine learning model configured to take as input a pair of single cell images (which may be sub-patches, as in the illustrated embodiment, or patched) and to produce as output a score indicative of the similarity between the single cell images is trained using the positive and negative pairs. Thus, the machine learning model is trained to give a high similarity score to positive pairs and a low similarity score to negative pairs. The machine learning model comprises an encoder module and a similarity module. The encoder module is configured to take as input a pair of single cell images and to produce as output a feature vector the single cell image. The similarity module is configured to take as input a pair of feature vectors for a pair of single cell images and to produce as output a score indicative of the similarity between the single cell images. The encoder module may comprise a pair of encoders each of which produces as output a feature vector for a single cell image. In other words, the encoder module may be configured to take as input a pair of single cell images and to produce as output a feature vector for each image in the pair of single cell images. The pair of encoders may be identical. Such configurations may be referred to as a Siamese network. The machine learning model preferably comprises a deep learning model, in the encoder module. In other words, the encoder is preferably a deep learning model. The machine learning model may have been trained using a loss function that weighs positive pairs more than negative pairs, such as e.g. a weighted binary cross entropy loss function, a normalized temperature-scaled cross entropy loss function, or a combination thereof.

At step 24B, an expanded set of reference single cell images is optionally obtained, from the initial set of reference single cell images. This may comprise using the initial reference set of single cell images and the trained machine learning model obtained at step 22B to classify a plurality of query single cell images from the training image as explained in relation to steps 20A, 22A. For each class of cells, one or more of the query cell images that are most dissimilar to any of the reference single cell images from the same class may then be selected. Then, a label may be obtained for each selected query single cell image. These newly labelled single cell images may then be included in an updated reference set of single cell images. This may be repeated a number of times.

At optional step 26B, a classifier model is trained to classify the feature vectors produced by the encoder module for each of the plurality of reference single cell images (in the initial set received at step 14B or the expanded step produced at step 24B, if performed) between classes corresponding to the plurality of cellular populations. For example, the classifier may comprise a support vector machine trained to separate feature vectors from single cell images into classes corresponding to the plurality of cellular populations by identifying a hyperplane that best separates the feature vectors from the reference images that correspond to different cellular populations in the plurality of cellular populations.

At step 20A, one or more sub-patches (for example, all sub-patches) from the query single cell image are provided to the encoder module of a trained machine learning model, such as that produced in step 22B, to obtain a feature vector(s) for the query single cell image. Where a plurality of sub-patches are used, the feature vector may comprise a feature vector for each of the sub-patches. The same process may be performed for the reference set of single cell images if reference single cell images were obtained at step 14A. Alternatively, feature vectors for the reference single cell images may have already been received at step 14A, which would have been obtained using the same encoder module. Note that the reference single cell images or feature vectors derived therefrom may have been expanded as explained in relation to step 24B.

The query single cell is then assigned to one of the plurality of classes based on the feature vector for the query single cell image and the feature vectors produced by the encoder module for each of a plurality of reference single cell images. This may be performed in at least two different ways explained by reference to steps 22A-24A and 26A, respectively.

At step 22A, the feature vector for the query single cell image and the feature vectors for each the plurality of reference single cell images is provided in turn to the similarity module of the trained machine learning module obtained at step 22B, thereby obtaining a plurality of scores indicative of the similarity between the query single cell image and each of the respective reference single cell image. Where sub-patches are used, as in the illustrated embodiment, a plurality of pairs comprising a sub-patch from the query single cell image and a sub-patch from a reference single cell image may each be associated with a similarity score by providing the feature vector for the sub-patch for the query image and the sub-patch from the reference single cell image to the similarity module. In such embodiments, the score indicative of the similarity between the query single cell image and the respective reference single cell image may comprise a score predicted by the machine learning model for each distinct pair of sub-patches. In some embodiments, similarity scores for pairs of reference single cell images (or sub-patches derived therefrom) may be obtained. For example, for each distinct pair of reference single cell images, the feature vector for the reference cell images may be provided to the similarity module of the machine learning model, thereby obtaining a plurality of scores indicative of the similarity between the reference cell images in the respective pairs.

At step 24A, the query cell is assigned to one of the plurality of classes based on the plurality of scores obtained at step 22A. For example, the query cell may be assigned to the class that is associated with the reference single cell image that is predicted to be most similar to the query single cell image. This may be the reference single cell image of the reference set of single cell images that is associated with the highest score predicted by the machine learning model (amongst the reference set). When sub-patches are used, as in the illustrated embodiment, multiple approaches to assign a query cell to one of the plurality of classes based on the plurality of scores may be used. A first approach may comprise assigning the query cell to the class that is associated with the reference single cell image that comprises the sub-patch that was predicted to have the highest similarity with a sub-patch from the query single cell image. For example, all possible distinct pairs comprising a sub-patch from the query single cell image and a sub-patch from a reference single cell image may be assessed and the query cell may be associated with the class of the reference single cell image from which the sub-patch with the highest similarity score was obtained. Another approach may comprise selecting a representative sub-patch (e.g. the central patch) from the query single cell image and a representative sub-patch from each of the reference single cell images, and assigning the query cell to the class that is associated with the reference single cell image whose representative patch (e.g. central patch) is predicted by the machine learning model to be most similar to the representative patch of the query single cell image. Yet another approach may comprise assigning the query cell to one of the plurality of classes based on: the plurality of scores indicative of the similarity between the query single cell image and each of the respective reference single cell images, and the plurality of scores indicative of the similarity between the reference cell images in the respective pairs that has been optionally obtained at step 24A. For example, a similarity metric may be quantified between the plurality of scores indicative of the similarity between the query single cell image and the respective reference single cell image and the corresponding plurality of scores indicative of the similarity between the reference cell images in the respective pairs. A query cell may be assigned to the class that is associated with the similarity metric indicative of highest similarity. This may be the highest value, for example when the similarity metric is a similarity score. Alternatively, this may be the lowest value, for example when the similarity metric is a distance. A distance metric may be convenient, such as for example the L1 (Manhattan) or L2 (Euclidian) distance.

At step 26A, the query cell is assigned to one of the plurality of classes using a classifier model trained to classify the feature vectors produced by the encoder module for each of the plurality of reference single cell images between classes corresponding to the plurality of cellular populations, such as the trained classifier produced at step 26B. Where sub-patches are used, as in the illustrated embodiment, the feature vectors used by the classifier for each single cell image may comprise feature vectors produced by the encoder module for each of the plurality of sub-patches for the single cell image. Similarly, the classifier may have been trained at step 26B using feature vectors for the reference images that comprise feature vectors produced by the encoder module for each of the plurality of sub-patches for the reference single cell image. In general, feature vectors comprising feature vectors for a plurality of sub-patches may simply concatenate the sub-patch feature vectors according to a predefined order. The use of a predefined order may ensure that sub-patches that occupy the same region of a single cell image are compared to each other in the feature vectors.

At optional step 28A, one or more cellular composition metrics may be obtained using the classification obtained at steps 24A/26A for a plurality of query cells. For example, the amounts, ratios or proportions of cells in the sample belonging to each of the plurality of cellular populations may be determined using the number of query cells assigned to the respective classes corresponding to each of the plurality of cellular populations. As another example, the spatial distribution of cells in the sample belonging to one or more of the plurality of cellular populations may be determined. For example, any of the following information may be determined: the relative location of cells in two different ones of the plurality of cellular populations, the spatial concentration of cells in one or more of the plurality of cellular populations, the tissue location of cells in one or more of the plurality of cellular populations.

At step 30A, one or more results of the analysis may be provided to a user. This may include any of the information obtained at step 28A, or any information derived therefrom, the identity of one or more query cells (including e.g. the location of the cell and cellular population that it has been assigned to) or any information derived therefrom such as e.g. a cell identification mask (e.g. an image that can be overlaid on the original query image and indicates the location of query cells and their assigned class/cellular population).

At step 30B, the tool for analysing the cellular composition of a sample may be provided to a user. This may comprise any of: the trained machine learning model (or any part thereof such as the encoder module and/or the similarity module), the trained classifier, the expanded set of reference single cell images, and any other metrics or parameters associated with these.

The methods of the present invention are performed on cells/tissue samples (such as e.g. pathology samples) and in particular on images of such samples. The methods of the present invention are therefore ex vivo or in vitro methods, that is, the methods of the present invention are not practiced on the human body.

Applications

The above methods find applications in a variety of clinical contexts. In particular, any clinical context in which the presence and relative amounts of a plurality of cell populations provides a prognostic and/or diagnostic indication is likely to benefit from the present invention. For example, in the context of cancer, the identity and relative quantities of certain types of immune cells and/or cancer cells can be informative of prognosis (e.g. tumours with greater numbers of tumour infiltrating lymphocytes are known to be associated with better prognosis), likely response to a therapy (e.g. tumours with greater numbers of tumour infiltrating lymphocytes are known to be associated with better responses to checkpoint inhibitor therapy), or diagnosis (e.g. diagnosis of tumour or pre-tumoral lesions of various kinds may be performed by quantifying the number or proportions of one or more abnormal cell types in a tissue).

Thus, also described herein are methods of providing a prognosis for a subject that has been diagnosed as having a cancer, the method comprising analysing a pathology sample from the subject as described herein to quantify the amounts of single cells in one or more cell types of interest, wherein the amounts or relative amounts of single cells in the one or more cell types of interest are indicative of prognosis. Similarly, also described herein are methods of identifying a subject as having cancer or being likely to develop cancer, the method comprising analysing a pathology sample from the subject as described herein to quantify the amounts of single cells in one or more cell types of interest, wherein the amounts or relative amounts of single cells in the one or more cell types of interest are indicative of whether the subject has or is likely to develop cancer. For example, the presence, amount or relative amounts of cells in a sample belonging to one or more of a plurality of populations may be used to provide a diagnosis of neoplasia, to identify a particular subtype of neoplasia, and/or to discriminate benign vs malign cell populations. Further, also described herein are methods of treating a subject that has been diagnosed as having a cancer with a particular treatment, or identifying a subject that has been diagnosed as having a cancer as likely to benefit from a particular treatment. The method may comprise analysing a pathology sample from the subject as described herein to quantify the amounts of single cells in one or more cell types of interest, wherein the amounts or relative amounts of single cells in the one or more cell types of interest are indicative of whether the subject is likely to benefit from the particular treatment. The method may further comprise treating the subject with the particular treatment if the amounts or relative amounts of single cells in the one or more cell types of interest indicate that the subject is likely to benefit from the particular treatment.

The cancer may be a cancer type or subtype selected from, breast cancer (including breast ductal carcinoma breast and breast lobular carcinoma, and oestrogen resistant breast cancer (ER-breast cancer)), central nervous system cancer (including glioblastoma multiforme and lower grade glioma), endocrine cancer (including adrenocortical carcinoma, papillary thyroid carcinoma, paraganglioma & pheochromocytoma), gastrointestinal cancer (including Cholangiocarcinoma, Colorectal Adenocarcinoma, Liver Hepatocellular Carcinoma, Pancreatic Ductal Adenocarcinoma, Stomach-Esophageal Cancer), gynecologic cancer (including Cervical Cancer, Ovarian Serous Cystadenocarcinoma, Uterine Carcinosarcoma, Uterine Corpus Endometrial Carcinoma), head and neck cancer (including Head and Neck Squamous Cell Carcinoma, Uveal Melanoma), hematologic cancer (including Acute Myeloid Leukemia, and Acute Myeloid Leukemia), skin cancer (including Cutaneous Melanoma), soft tissue cancer (including Sarcoma), thoracic cancer (including Lung Adenocarcinoma (LUAD), Lung Squamous Cell Carcinoma (LUSC), Mesothelioma) and urologic cancer (including Chromophobe Renal Cell Carcinoma, Clear Cell Kidney Carcinoma, Papillary Kidney Carcinoma, Prostate Adenocarcinoma, Testicular Germ Cell Cancer, Urothelial Bladder Carcinoma). Each of these cancers is the subject of study as part of The Cancer Genome Atlas project.

The cell identities and metrics derived therefrom (such as e.g. the amounts or relative amounts of single cells classified as belonging to one or more cell types of interest), as described herein, may also be used to determine the cell composition, distribution, functional phenotypes, and cell-cell interactions within a tissue microenvironment, such as e.g. a tumour microenvironment. These may in turn be used, for example to discover predictive and/or prognostic markers, discover predictors of responsiveness to tumour therapies, and assess the distribution of drug targets. Indeed, multiplex imaging technologies as reviewed in [5] (all of which can be used within the context of the present disclosure), have been shown to have the ability to provide prognostic and predictive markers in the context of cancer (see also which reviews deep learning approaches for automated analysis of mIHC images and their use in the spatial analysis of the tumour microenvironment). For example, identification of subsets of immune cells was shown to have predictive and prognostic value in several types of cancers [5]. Specific examples include: PD-L1 positive cells as a marker for personalised immunotherapy; PD-1 to PD-L1 positive cells proximity, CD8+ cell density in the tumour microenvironment, and/or co-expression of markers of T-cell activation as markers for predicting response to anti PD1/PDL1 therapy; tumour-infiltrating lymphocytes (such as FOXP3+ regulatory T cells (Treg), CD20+ B cells, CD38+ plasma cells, PD-1+ CD8+ T cells and proliferating immune subsets) as prognostic markers in breast cancer; multiparametric immune profiling including quantitative spatial distribution of immune subsets (e.g. number of $FOXP3^+$ and $PD-L1^+$ cells present within a certain distance of $CD8^+$ T cells) as a prognostic parameter, the distance between tumour infiltrating B cells and T cells as a marker of improved clinical outcome, the presence of CD8+ tissue-resident memory T cells in the tumour microenvironment as a marker of immune exhaustion, the presence of tumour-infiltrating memory $T_{RM}$ and $CD8^+$ effector memory T cells (TEM) expressing markers of tumour exhaustion (such as PD-1) as a marker of tumour evasion and predicted responsiveness to PD-1 blockade treatment.

Thus, the disclosure also relates to a method of providing a diagnostic and/or prognostic for a subject, the method comprising analysing the cellular composition of a sample from the subject using the methods described herein, wherein the cellular composition of the sample is indicative of a diagnostic and/or prognostic. Analysing the cellular composition of a sample may comprise determining the amounts, ratios or proportions of cells in the sample belonging to one or more of a plurality of populations by classifying a plurality of query cells (or more specifically, a plurality of query single cell images) in an image of the sample between a plurality of classes comprising one or more classes corresponding to respective cellular populations in the plurality of cellular populations, using the methods described herein. Analysing the cellular composition may further comprise determining one or more parameters of the spatial distribution of cells in one or more of the plurality of populations, such as for example the distance between cells in respective populations of the plurality of populations, or the amount or proportion of cells in one of the plurality of populations that are within a predetermined distance of another one of the plurality of populations. The disclosure further relates to a method of determining the distribution of drug targets in a tissue, the method comprising determining the amounts, ratios, spatial distribution or proportions of cells in the sample belonging to one or more of a plurality of populations by classifying a plurality of query cells (query single cell images) in an image of the sample between a plurality of classes comprising one or more classes corresponding to respective cellular populations in the plurality of cellular populations, using the methods described herein, wherein the one or more of the plurality of cellular populations are targets of the drug. The distribution of drug targets in a tissue may further be used to provide a prognostic indication.

Systems

Figure 2:
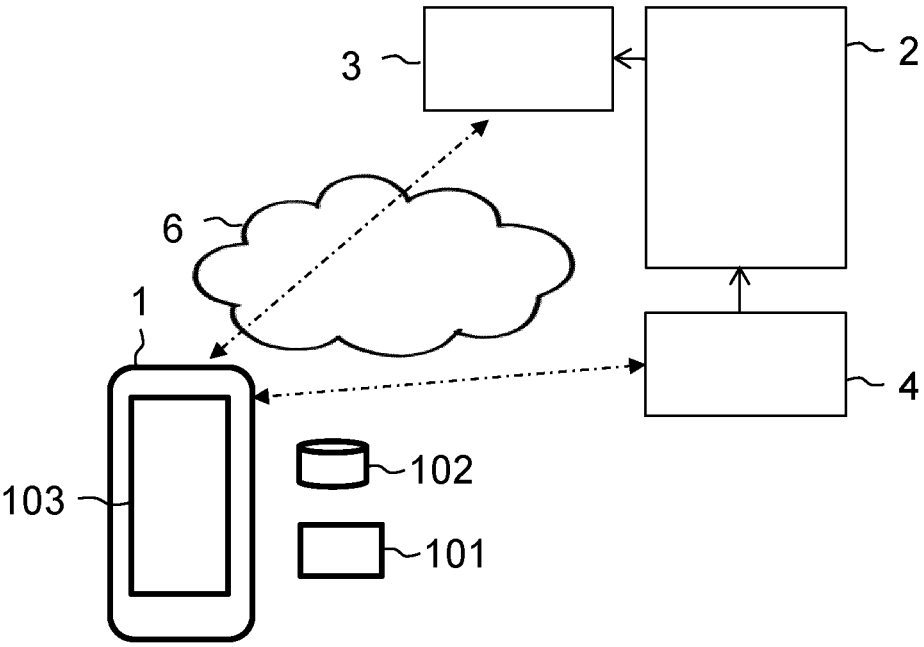
FIG. 2 shows an embodiment of a system for analysing pathology samples.

FIG. 2 shows an embodiment of a system for analysing cells or tissue samples, such as e.g. histopathology samples, according to the present disclosure. The system comprises a computing device 1, which comprises a processor 11 and computer readable memory 12. In the embodiment shown, the computing device 1 also comprises a user interface 13, which is illustrated as a screen but may include any other means of conveying information to a user such as e.g. through audible or visual signals. The computing device 1 is communicably connected, such as e.g. through a network, to image acquisition means 3, such as a microscope or scanner, and/or to one or more databases 2 storing image data. The computing device may be a smartphone, tablet, personal computer or other computing device. The computing device is configured to implement a method for analysing images, as described herein. In alternative embodiments, the computing device 1 is configured to communicate with a remote computing device (not shown), which is itself configured to implement a method of analysing images, as described herein. In such cases, the remote computing device may also be configured to send the result of the method of analysing images to the computing device. Communication between the computing device 1 and the remote computing device may be through a wired or wireless connection, and may occur over a local or public network such as e.g. over the public internet.

The image data acquisition means may be in wired connection with the computing device 1, or may be able to communicate through a wireless connection, such as e.g. through WiFi, as illustrated. The connection between the computing device 1 and the image data acquisition means 3 may be direct or indirect (such as e.g. through a remote computer). The image data acquisition means 3 are configured to acquire image data from samples, for example histopathology samples or other samples of cells and/or tissues. In some embodiments, the sample may have been subject to one or more preprocessing steps such as fixation, labelling, etc. The image acquisition means 3 acquire signal associated with cells or cellular structures in the sample. The signal may be associated with a label that associated with desired cells or cellular structures in the sample. Thus, the samples may be labelled with one or more labels associated with signals that are detectable by the image data acquisition means 3. In some embodiments, it may not be necessary to actively label the target. Signal detection may be done by any method for detecting electromagnetic radiation (e.g., light) such as a method selected from far-field optical microscopy, near-field scanning optical microscopy, epi-fluorescence microscopy, confocal microscopy, two-photon microscopy, optical microscopy, and total internal reflection microscopy, where the cell or cellular structure is labelled with an electromagnetic radiation emitter. Thus, the image acquisition means 3 may comprise a far-field optical microscope, a near-field scanning optical microscope, an epi-fluorescence microscope, a confocal microscope, a two-photon microscope, an optical microscope, or a total internal reflection microscope. Conveniently, the image acquisition means may comprises a confocal microscope. The image acquisition means 3 is preferably configured to acquire fluorescence and/or optical images. The methods of the present disclosure find particular use in the context of analysis of histopathology images obtained by immunohistochemistry and/or immunofluorescence, and in particular multiplex immunohistochemistry/immunofluorescence. Thus, any image acquisition mean that is suitable to acquire immunohistochemistry and/or immunofluorescence images may be used.

The following is presented by way of example and is not to be construed as a limitation to the scope of the claims.

EXAMPLES

Introduction

To leverage the advantages of deep learning and to reduce the annotation burden associated with known supervised deep learning approaches, the inventors reasoned that they could use intrinsic features from unlabelled data to facilitate the supervised task. For example, they reasoned that a network could be trained to differentiate similar and dissimilar images without external class labels, with the hope that the features learnt in this self-supervised manner can benefit the cell identification task. Thus, they proposed a novel pipeline (termed "SANDI", self-supervised antigen detection AI) integrating self-supervised and deep learning, and evaluated its capability to distinguish cell types from multiplex IHC slides with minimal human inputs.

Methods

Datasets

For experiments conducted in this study, two models were trained and validated. A first model used a similarity score-based cell classification (see below, referred to herein as SANDIsc), and a second model used a reference-based classification (see below, referred to herein as SANDI).

The SANDIsc model was trained and validated on 4 multiplex IHC datasets:

4 ovarian tumor slides stained for CD8, CD4, FOXP3, and PD1, identifying 6 different cell types (FOXP3$^+$; PD1$^+$; CD8$^+$; CD4$^+$; PD1$^+$ CD8$^+$; and PD1$^+$ CD4$^+$)—referred to herein as "Ovarian1";

4 ovarian tumor slides stained with PDL1 targeted antibody and haematoxylin (H), identifying 2 cell types (PD1$^+$H$^+$; PD1$^-$H$^+$)—referred to herein as "Ovarian2"; and 6 ER− (ER negative) breast cancer slides stained for CD8 and pSTAT, identifying 5 cell types (Gal+pSTAT−, CD8+, Gal+pSTATWeak, Gal+pSTATModerate, and Gal+pSTATStrong, where the last three are separated based on the intensity of the pSTAT staining).

The SANDI model was trained and validated on an expanded dataset (including the above data and additional data), comprising three multiplex IHC datasets, including nine ovarian cancer slides stained with CD8/CD4/FOXP3/PD1, nine ovarian cancer slides with PDL1/haematoxylin, and six oestrogen receptor-negative (ER–) breast cancer slides with CD8/Gal8/pSTAT. The ovarian cancer data is unpublished data, and the ER– breast cancer data was obtained from [17]. Details of the three datasets are summarised in Table 1 below.

TABLE 1

| Composition of the three datasets used to train the SANDI models. | | | | | |
|---|---|---|---|---|---|
| | | No. of annotations | | Total no. of annotations | |
| Dataset | Cell classes | Training | Testing | Training | Testing |
| Ovarian1 | CD4 + FOXP3+ | 292 | 197 | 1828 | 997 |
| | CD4 + FOXP3– | 596 | 168 | (4 slides) | (5 slides) |
| | PD1 + CD8+ | 726 | 347 | | |
| | PD1 – CD8+ | 139 | 203 | | |
| | PD1 + CD4+ | 39 | 60 | | |
| | PD1 + CD8 – CD4– | 36 | 22 | | |
| Ovarian2 | PDL1+ | 410 | 958 | 870 | 2409 |
| | Haematoxylin-stained | 460 | 1451 | (2 slides) | (7 slides) |
| ER– | Gal + pSTAT– | 4565 | 1438 | 18111 | 4201 |
| breast | CD8+ | 3678 | 741 | (4 slides) | (2 slides) |
| [17] | Gal + pSTATWeak | 7174 | 914 | | |
| | Gal + pSTATModerate | 1534 | 825 | | |
| | Gal + pSTATStrong | 1160 | 282 | | |

In both cases, slides were scanned at 40× magnification and were down-sampled to 20× before processing. The reason for including multiple datasets was to evaluate the model performance across various IHC combinations and cancer types.

For each slide, a single multicolour (RGB) image was obtained. In the foregoing, the term "slide" is used to refer to these images.

Single-Cell Patches Sampling

A single cell detection algorithm using a pre-trained deep learning model was applied to all slides. To build the dataset for self-learning purpose, the first step was to sample single-cell patches from the whole slide images (WSI). In an ideal situation where the percentage of each cell types present in the dataset was balanced, one could randomly sample from the pool of all detected cells and expect an equal chance of capturing each cell type of interest. However, it was common to have a dataset skewed towards specific cell types in the real scenario, which might cause some rare cell types to be missed out by random sampling. To tackle this problem and to investigate the impact of data unbalance on the model performance, the inventors introduced a data sampling step specialised for the multiplex image. First, small regions on the WSI that contained diverse cell types (see FIG. 4, step 1) are identified, then a pathologist determines the class identity of each cell by dot annotating the cell centre with different colour specific for each cell type. The selection of regions ensures that a considerable number of each cell type are included in the training dataset. Manual labels reveal the composition of cell types within the regions and provide ground truth for model evaluation. A 28×28 pixel patch around each dot annotation was retrieved to form the dataset. All patches from slides used for model training were pool together and randomly allocated to the training set or the validation set with a 4:1 ratio. It is worth noting that the sophisticated annotation to the extent of cell classes was for experiment purpose only, in practice the training dataset can be built on single-cell patches without class labels (such as e.g. the direct output of a machine learning algorithm trained to segment an image into single cell patches, such as e.g. the SC-CNN in [12], or unsupervised methods based on staining intensities to detect the location of cells such as in [9]).

Patch Cropping and Pairing

Given a dataset containing n single-cell image patches $D_n=\{x_i, \ldots, x_n\}$, we first generated all possible combinations $C_2=\{(x_i, x_j)\in D|i\neq j\}$. For each batch, N pairs $(x_i, x_j)$ of 28×28 patches were randomly sampled from the whole dataset $C_2$ without replacement (see FIG. 4, step 2). For each pair, the acquired patches $x_i$, $x_j$ were each cropped into nine 20×20 pixel sub-patches with a stride of 4 pixels (for the training of the SANDIsc model—FIG. 4, step 2) or were each randomly cropped into 20×20 pixel sub-patches $x_{d_i, s_i}$ (for the training of the SANDI model, FIG. 4, step 2'). Then n random pairs of sub-patches retrieved from the same patch were labelled as positive (label 0/$P^+=\{x_{d_i, s_i}, x_{d_j, s_j})\in C_2|d_i=d_j, s_i\neq s_j\}$), and n random pairs from the matched patch were labelled as negative (label 0/$P^-=\{(x_{d_i,s_i}, x_{d_j,s_j})\in C_2|d_i\neq d_j, s_j\neq s_j\}$). For the SANDIsc model, the total number of sub-patch pairs of the training and the validation dataset was 2N*n. In the experiment, N and n were set to 1000 and 5 respectively, with the pairing of cells constrained to the same slide. Sub-patch pairs were randomly permuted before feeding to the network (see FIG. 4, step 2). For the SANDI model, the total number of $P^+$ and $P^-$ in a batch is 2N with N set to 256 in the experiment (see FIG. 4, step 2'). Images RGB values were normalized to the range (0,1) before feeding to the network.

The rationale behind comparing sub-patches randomly cropped from single-cell images is to mimic the inspection by pathologist where a slight shift in the field of view does not affect the judgement of cell identities.

Network Architecture and Training

Figure 4:
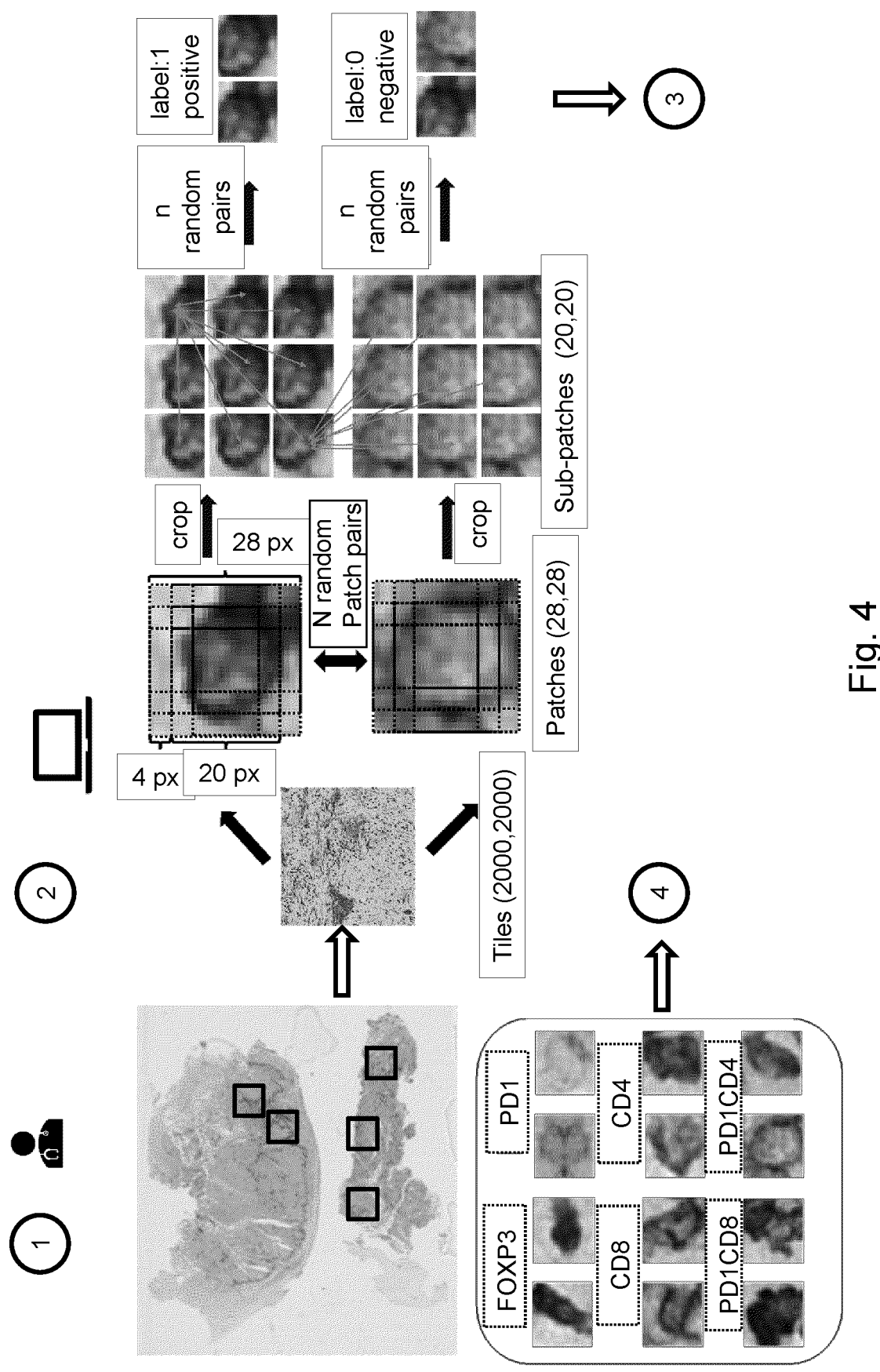
FIG. 4 illustrates schematically an example of a method of analysing pathology images according to the disclosure. 1. Minimal human input: regions of interest and reference single cell patches were manually selected. 2. Data preparation process. Single-cell patches of 28×28 pixel were retrieved from manually picked regions (tiles of 2000×2000 pixels) and randomly paired. The single cell patches were then cropped into nine 20×20 pixel sub-patches. Sub-patches pairs were then selected and labelled. Sub-patches pairs originating from the same patch were labelled as positive (1), otherwise negative (0). 2'. Alternative data preparation process. Single-cell patches of 28×28 pixel were retrieved from manually picked regions and were randomly paired and cropped into 20×20 pixel sub-patches. Sub-patches pairs originated from the same patch were labelled as positive ($P^+$), otherwise negative ($P^-$). 3. Model training: A Siamese network was trained on an equal number of negative and positive pairs to distinguish whether the two patches in a pair are from the same image. The trained network outputs a value between 0 and 1, which is interpreted as the similarity score between a pair of patches. 4. Classification: a query cell is compared against each reference image based on the similarity score predicted by the neural network. Cell class was determined using a similarity criterion selected from the maximum score of all sub-patches, maximum score of the middle sub-patch, or the minimum pair-wise distance on similarity score vectors.
Figure 4:
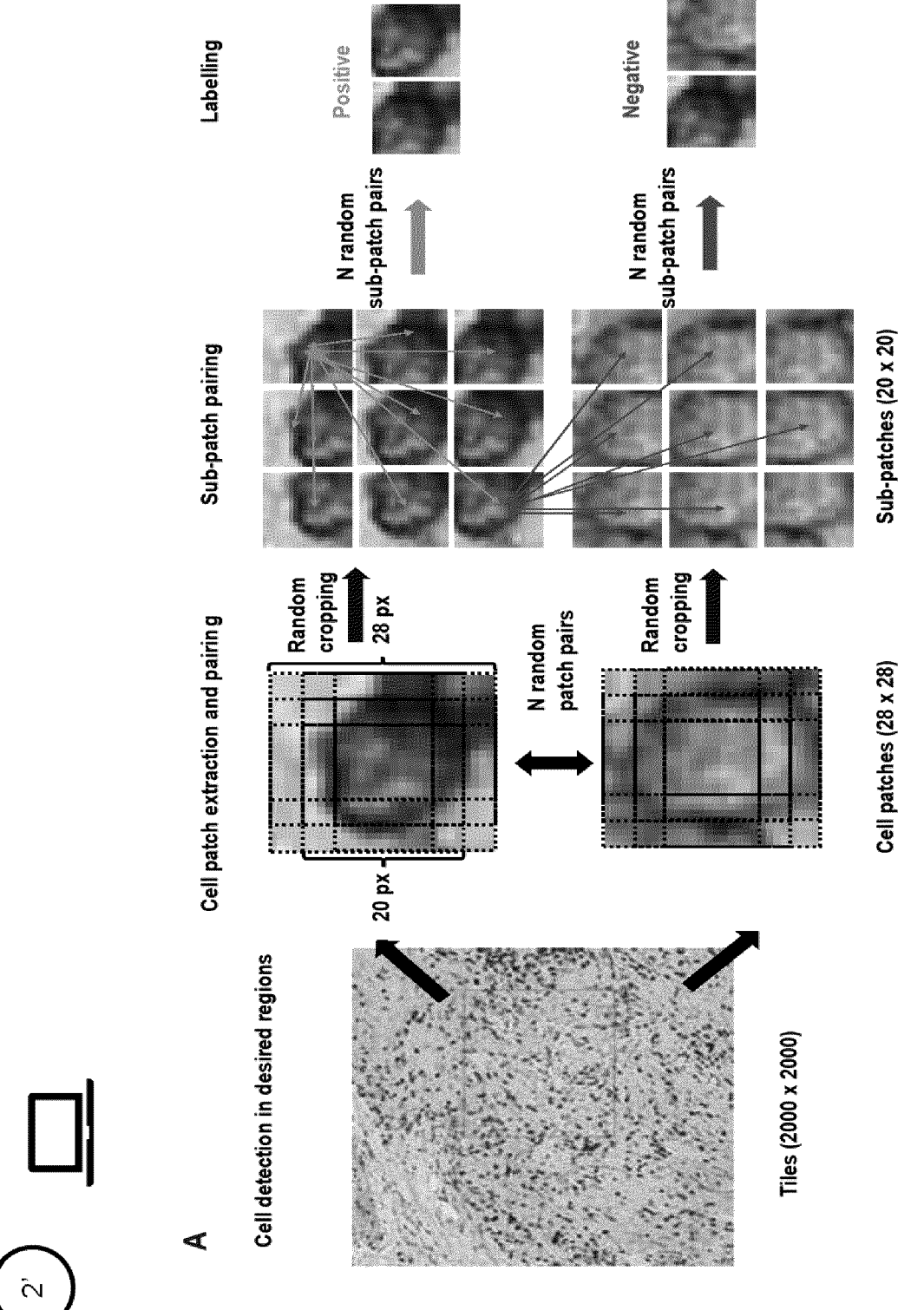
Figure 4:
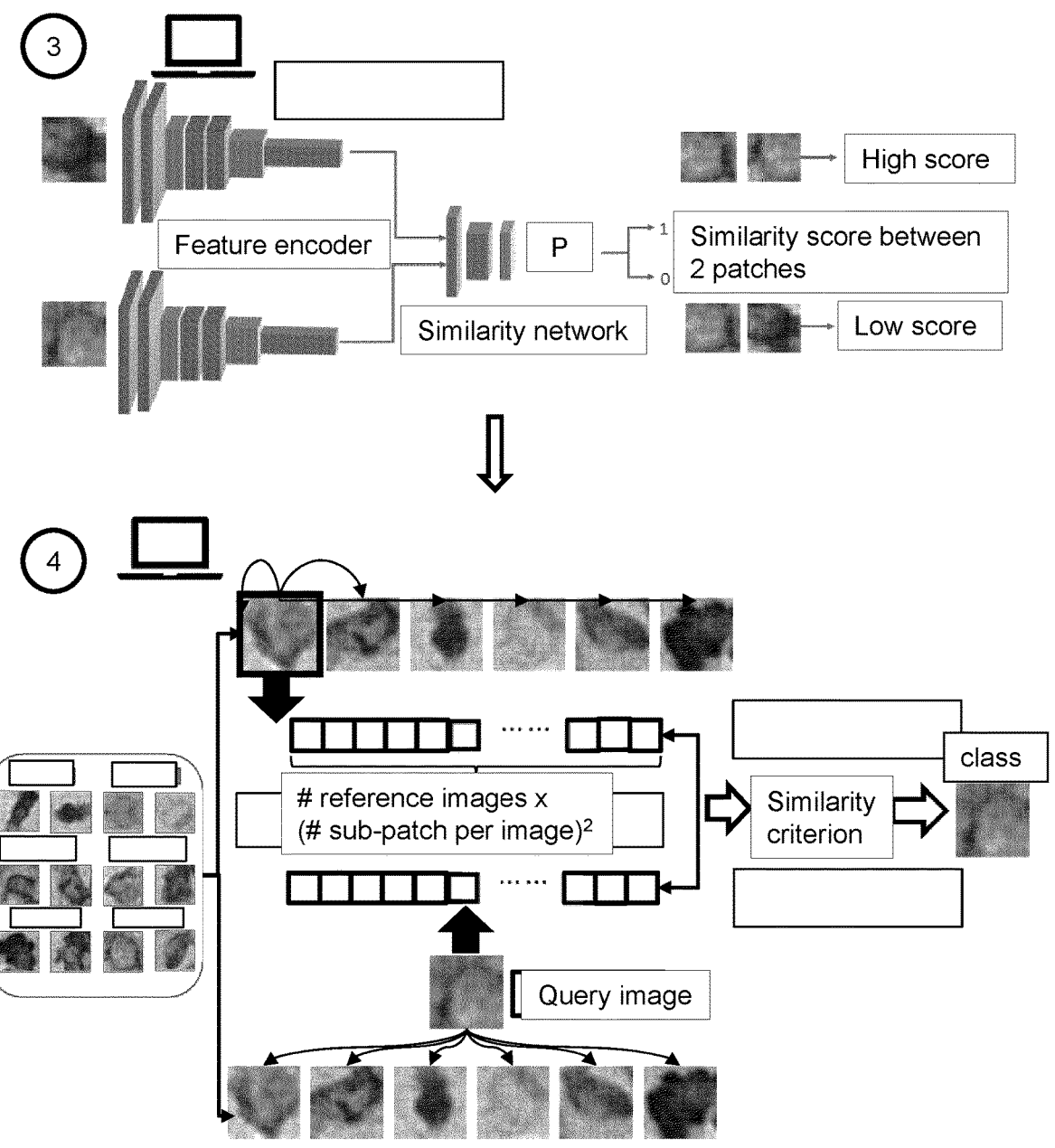
Figure 5A:
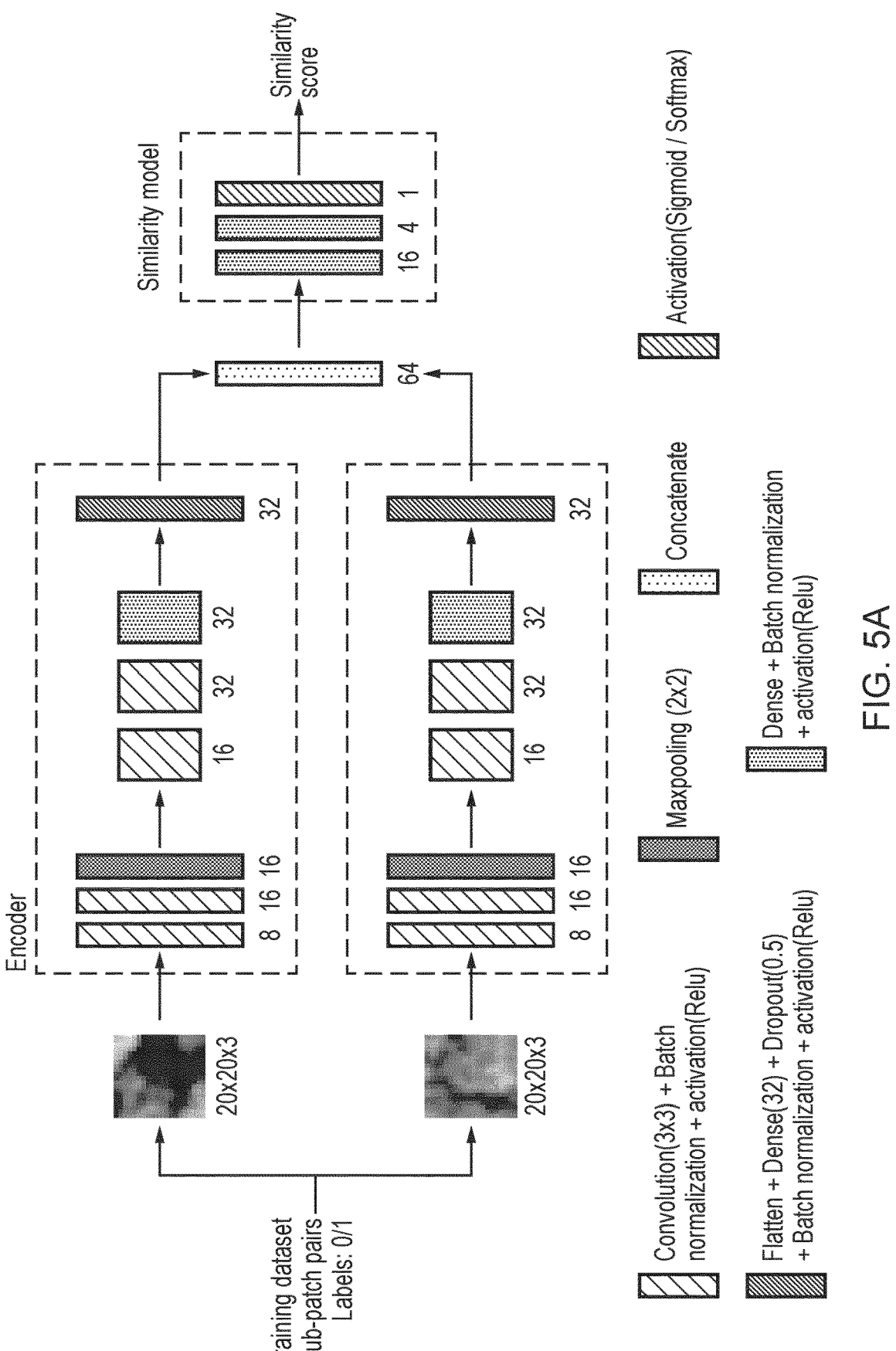
FIG. 5 illustrates schematically a network architecture suitable for use in methods of the disclosure, such as the method of FIG. 4. A. Pairs of input sub-patches are processed by two identical encoders to generate a feature vector of size 32. The encoded features are concatenated as inputs for a similarity model, which learns to predict a similarity score between 0 and 1. B. The same network architecture as in A is shown but two possible loss functions are additionally shown: NT-XEnt loss (normalized temperature-scaled cross entropy loss) which is calculated based on the similarities between the 12 normalized embeddings of sub-patch pairs, and the weighted binary cross-entropy loss function which is calculated based on the output of the similarity branch.
Figure 5B:
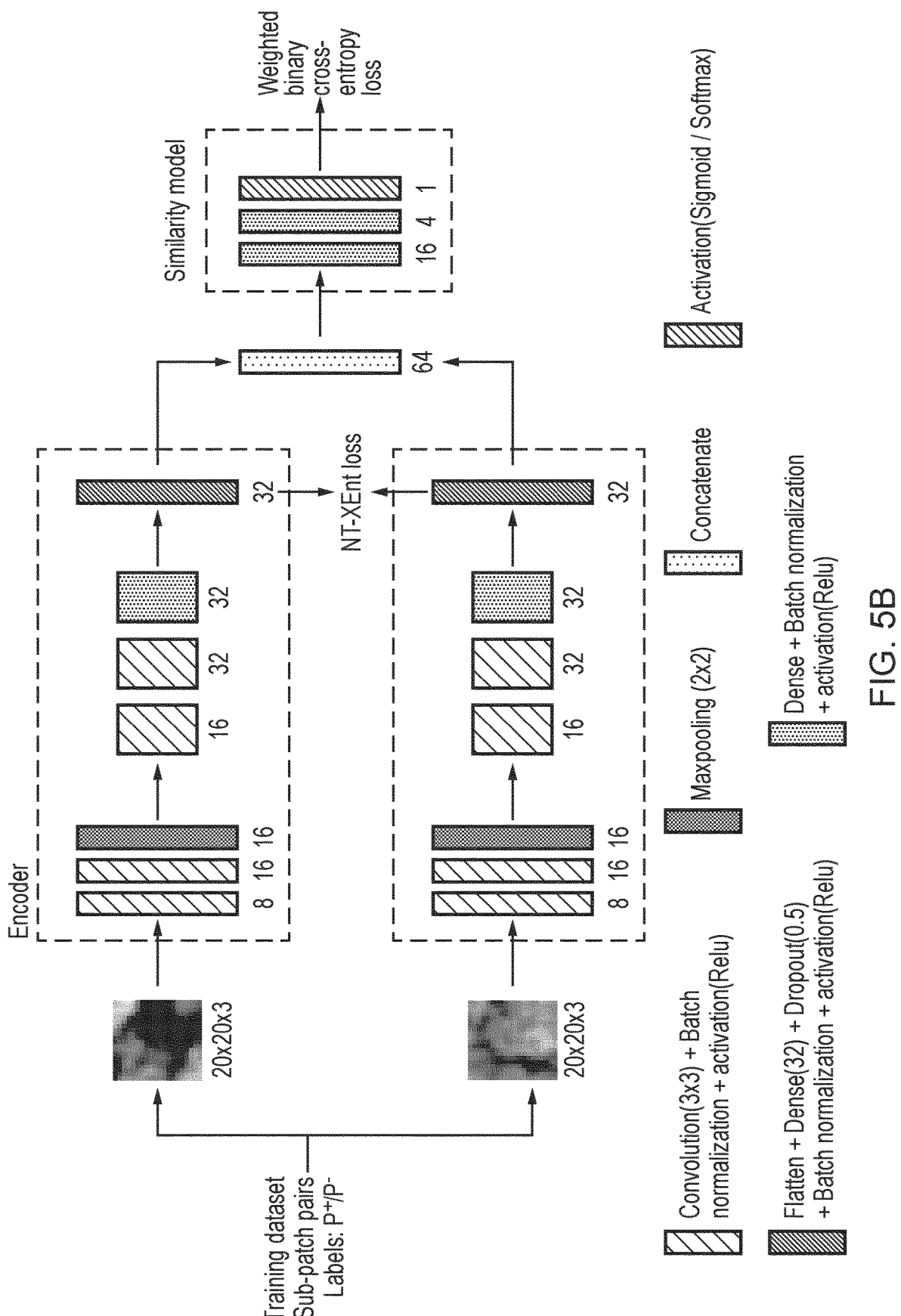

A double branch Siamese network was used to learn the representative feature of input image pairs that makes them similar or disparate (see FIG. 4, step 3). As shown in FIG. 5, the network consisted of two identical encoder branches conjoined at their last layers followed by a single branch to compute the final output (similarity metric between the two inputs). Each encoder contained a series of convolution, activation, batch normalization, max-pooling, and dropout layers, which encoded the image into a vector of 32 features. The single branch concatenated the outputs from the two encoders and fed it through a dense layer, followed by linear activation, batch normalization, Relu activation and Sigmoid activation layers to generate a value between 0 and 1. Thus, the trained network outputs a value between 0 and 1, representing the level of pair-wise similarity between two images, and with the value 0 representing no similarity and the value 1 representing the 'highest' similarity.

For cell classification purpose, the network was expected to generate a high score for cells from the same class, and a low score for cells from distinct classes. However, since the network was trained to identify similar or disparate pairs at the image level instead of at the cell class level (i.e. the network was trained to identify similar or dissimilar pairs randomly sampled from the unlabelled dataset), two images from the same class might have been labelled as negative during the data preparation, which biased the network towards features that distinguish images from the same class. To reduce the impact of uncertainty in negative labels, the loss of negative samples was constrained by using a weighted binary cross-entropy as the loss function. The loss function can be expressed as:

$$L = -\sum_{i=1}^{N} w_i \cdot \log(p(x_i; f(x)))w_i = \begin{cases} 0.7 & x_i = 1 \\ 0.3 & x_i = 0 \end{cases}$$

where $w_i$ denoted the pre-defined factor applied to the entropy loss of $x_i$, or:

$$L_{wbce} = -\frac{1}{N}\sum_{i=1}^{N}(w^+\log(f_s(P_i^+)) + w^-\log(f_s(p_i^-)))$$

where $f_s$ denotes the similarity branch, N is the total number of positive or negative pairs within a batch, and w+, w" denote the pre-defined weights applied to the entropy loss of positive pairs Pi+ and negative pairs Pi. In the experiment, $w_i/w^+$, $w^-$ was set as 0.7 and 0.3 for positive (w+) and negative (w⁻) samples respectively. The network was trained on equal numbers of positive and negative pairs.

For the SANDI model, to further constrain the latent representations to maximize the agreement between positive pairs, $L_{wbce}$ was combined with the normalized temperature-scaled cross entropy loss (NT-XEnt), which is expressed as $$L_{NT-XEnt} = -\log\frac{\exp(sim(z_i, z_j)/\tau)}{\sum_{k=1}^{2N} \mathbb{1}_{[k\neq i]}\exp(sim(z_i, z_k)/\tau)}$$

where z denotes the $l_2$ normalized embedding of sub-patch $x_{d_i,s_i}$, sim denotes cosine similarity, $\mathbb{1}_{[k\neq i]}$ equals to 1 if k≠i, otherwise 0. τ denotes the temperature parameter, which is set as 0.1 in the experiment. For a given sub-patch $x_{d_i,s_i}$, the NT-XEnt loss treats the sub-patch $x_{d_i,s_i}$; originated from the same patch as positive samples, and all the other (2N–2) sub-patches within the batch as negative samples. NT-XEnt was shown to outperform other similar contrastive loss functions in [18]. The combined loss used was the combination of $L_{wbce}$ and $L_{NT-XEnt}$, as given by: $L_{combined}=L_{wbce}+L_{NT-XEnt}$.

The model was trained on an Intel i7-9750H CPU for 100 epochs, with a batch size of 100 (for the SANDIsc model) or 256 (for the SANDI model), a consistent learning rate of 0.001 and Adam as the optimizer. Model weights were saved if the validation loss was the minimum among previous epochs (i.e. the model with minimal validation loss was selected for evaluation).

The outputs of the network (sub-patch level similarity scores) are used to classify single cell patches between a set of reference cell types.

Similarity Score-Based Cell Classification

To translate the similarity score estimated by the network to cell classification in the SANDIsc model, a set of reference images were selected as representations of each cell type (see FIG. 4, steps 1 and 4). Between 2 and 5 reference images were used for each cell type (2-5 cell images/type for the Ovarian1 dataset, 2 cell images/type for the ER-breast dataset, and 5 cell images/type for the Ovarian2 dataset, see FIG. 6D which shows the reference images used for the Ovarian1 dataset). In general, the major class (cell types more frequently found on the slide) are likely to have more heterogeneity in appearance. As such, they are also likely to be more scattered in the latent space compared to the cell types that are minor in number. Therefore, it is likely to be beneficial for the reference set to include a larger number of representatives of the major class than for the minor class (es). Both the reference and the query images were cropped into 20×20 pixel sub-patches before being processed by the trained network. A query image is compared against each reference image, using the patch-level similarity scores predicted by the trained network. Then, the query image is assigned the class of the reference image that satisfies a chosen criterion applied to the sub-patch scores obtained. The identity of a query cell patch can be determined based on the predicted similarities between pairs of sub-patches in a variety of ways. Three voting strategies for similarity score-based cell were examined as described in Table 2.

TABLE 2

Methods for cell classification based on similarity score. $N_r$, $N_q$ denote the total number of reference and query images, respectively.

| Method | Description | Number of comparisons |
|---|---|---|
| Maximum similarity score | Cell class is assigned as the label of the reference image that showed the highest similarity score across all sub-patch pairs. | $9^2*N_r*N_q$ |
| Central similarity score | Cell class is determined by the reference image with the highest similarity score for only the central sub-patch. | $N_r*N_q$ |
| Pair-wise distance | Each reference image is compared against the entire set of references, generating a set of similarity scores of length $9^2*Nr$, where Nr was the | $9^2*N_r*N_r + 9^2*N_r*N_q + N_r*N_q$ |

TABLE 2-continued

| | | Number of |
| | | comparisons |
|---|---|---|
| Method | Description | |

Methods for cell classification based on similarity score. $N_r$, $N_q$ denote
the total number of reference and query images, respectively.

number of reference images. The L1 distance
between the set of similarity score calculated by
comparing the query image and each reference,
and the set of similarity score for the reference is
measured. Cell class is determined by the minimal
L1 distance.

Reference-Based Cell Classification

Identification of cells from multiplex images are dependent on stain concentrations and morphology of the cell, which can be affected by experimental artefacts and out-of-focus regions. Noise in data/label are believed to be an issue concerning the model performance in digital histology image analysis. To ensure quality of cell images while minimizing the need for annotation, the inventors selected a set of reference images $R_n=\{x_i, \ldots, x_n\}$ from the training dataset D as representations of each cell type (as described above). Each cell in a hold-out testing set is treated as a query image $x_{q_i}$. Both the reference image $x_{r_i}$ and query image $x_{q_i}$ are cropped into 9 20×20 pixel sub-patches and processed by the trained encoder to yield the latent embeddings $f(x_{ri,si})$ and $f(x_{qi,si})$ of size 32*9. Assembling features of sub-patches allow the local regions neighbouring to the cell to be incorporated for downstream classification, which has shown to generate more accurate predictions as explained above.

A Support Vector Machine (SVM) classifier with linear kernel implemented in libsvm library was then employed to separate cell images into classes based on the decision hyperplane optimized for the references samples. To be more precise, the SVM classifier is trained on feature embeddings of references $f(x_{ri,si})$ and predicts cell class for embeddings of unlabelled samples $f(x_{yi,si})$.

Automatic Expansion of the Reference Set

To effectively select reference images for model performance while minimizing the amount of annotations required, the inventors constructed a reference set with iterative model prediction and manual labelling, with the attempt to correct labels for instances where the classification confidence is the minimum. This expanded reference set was used for the SANDI model (not the SANDIsc model, although the expanded reference set could also have been used for the SANDIsc model).

Figure 8:
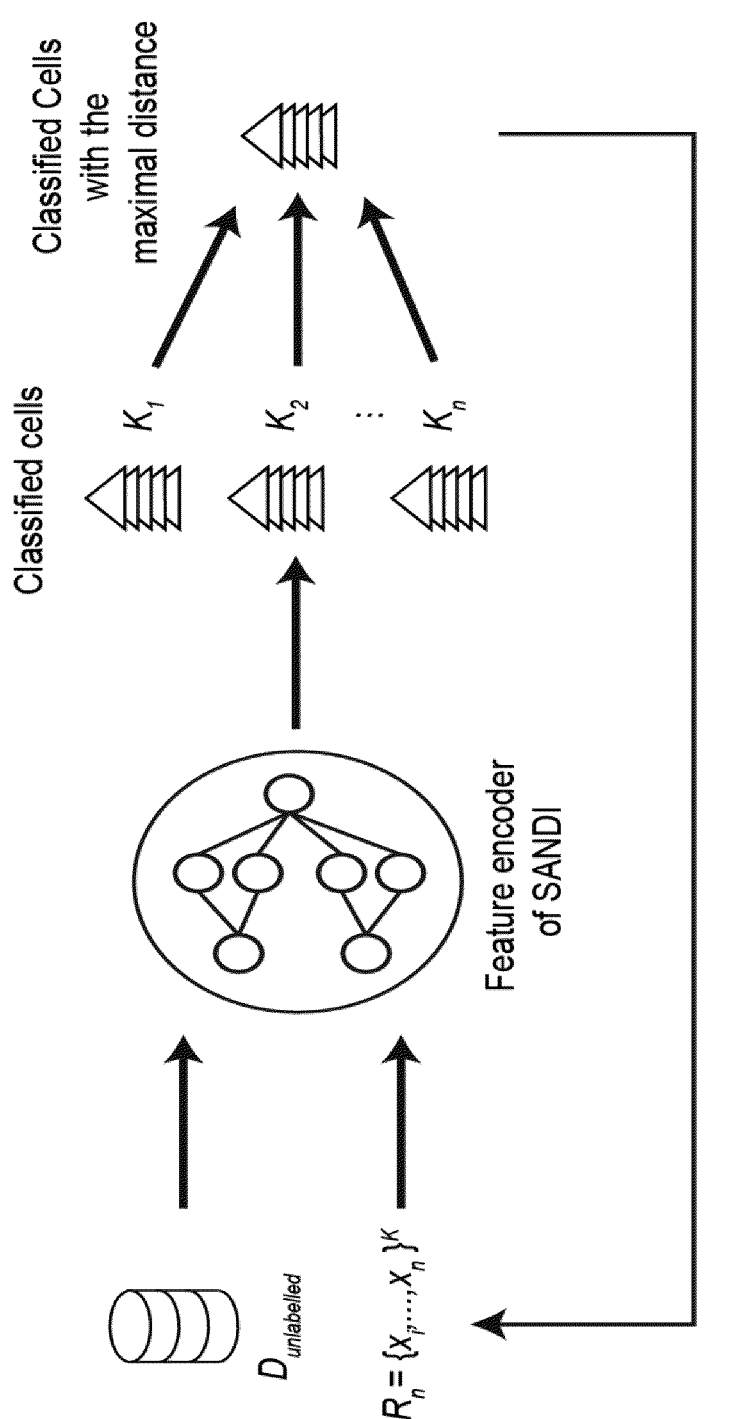
FIG. 8 is a flowchart illustrating schematically a procedure for automatic expansion of reference set as described herein. A set of unlabelled cell images $D_{unlabelled}$ and an initial reference set $R_n$ containing 1 reference image for each cell type K are provided in the first round. Both $D_{unlabelled}$ and $R_n$ are cropped to nine 20×20 pixel sub-patches and processed by the trained feature encoder, following by the reference-based cell classification to generate a set of classified cells for each cell type K. The instance with the maximal Manhattan distance is selected for manual labelling, which is then merged with $R_n$ from the previous round to form the new reference set. The process may then be repeated a number of times and the quality of reference set from each round may be evaluated based on classification accuracy on the testing set.

As illustrated on FIG. 8, the process starts by nominating 1 image for each cell class as a representative (although more images could be selected, such as e.g. 2 to 5 images selected as explained above), then the minimal Manhattan distance dist between embeddings of unlabelled images $f(x_{qi,si})$ and each reference image $f(x_{ri,si})$ was used to determine the cell type. This distance-based classification method is described by:

$$\underset{ri}{\operatorname{argmin}} \, p(y \mid dist(f(x_{ri,si}), f(x_{qi,si}))).$$

Then, as an automated reference set expansion, for each group of cells as class K, the cell with the maximum Manhattan distance to any of the reference cells from the same class K was selected and manually labelled. These newly selected cells were then added to the previous reference set, while ignoring repeated instances. The two steps were repeated for 10 rounds and the weighted F1-score computed on the testing set was examined using the reference set from each round.

As a result of this process, the number of references is not balanced by their true class. For example, the reference set of Ovarian1 at the $10^{th}$ iteration contained 20 references for CD4+FOXP3− cells, 4 references for PD1-CD8+ cells, 19 references for PD1+ CD8+ cells, 7 references for PD1+ CD4-CD8− cells, 4 references for PD1+ CD4+ cells, and 12 references for CD4+FOXP3+ cells.

Weakly Supervised and Fully Supervised Models

For the evaluation of the SANDIsc model, a weakly supervised version of the SANDIsc pipeline (referred to as "controlled SANDIsc"), as well as a fully supervised spatially constrained convolutional neural network (SCCNN) model [14], were obtained and compared with the self-supervised SANDIsc described above, for each of the 4 datasets described above as used for the training and evaluation of the SANDIsc model. The controlled SANDIsc shared the same architecture with SANDIsc, but was trained on pairs of sub-patches labelled as positive if they were from the same patch, and negative if they were from different cell classes. Thus, the controlled SANDIsc uses manual cell class annotations to help increase the amount of information provided by the negative pairs in the training data. A conventional binary cross-entropy without extra weighting of positive/negative labels was used as the loss function.

The fully supervised SCCNN model was trained on explicit cell class labels. The architecture of the fully supervised SCCNN model was as described in [12]. Briefly, the network comprises: 3 blocks each containing a sequence of convolutional layer, Relu activation layer and max pooling layer, followed by 2 additional blocks each with a convolutional layer, a Relu activation layer and a dropout layer, and a final layer that is a dense layer with the 'softmax' activation function. The number of filters in the convolutional layers were set to 32, 64, 128, 1024 and 512.

For the evaluation of the SANDI model, the self-supervised SANDI was compared to: a fully supervised SCCNN classifier as described above and in [12], and a supervised classifier trained on 10%, 20%, 30% and 100% of annotations data. The supervised classifier has a single feature encoder of the same architecture as the encoder of SANDI, followed by a similar similarity branch without the concatenating layer and with the kernel number of the last second and the last dense layer set to 16 and equal to the number of cell classes respectively. Random flipping was applied to training samples for data augmentation.

For the SANDIsc and controlled SANDIsc models, the quality of model representations regarding cell classification was evaluated using a linear SVM (support vector machine)

classifier trained on top of the last layer of the encoder. In particular, a linear SVM was trained to predict the ground truth labels from features generated by the encoder of the SANDI model. The linear SVM was trained on a part of the training data for the SANDI model (in particular, 70% of the testing set) using model embeddings of central sub-patches, and validated on a hold-out testing set containing the rest of the data (i.e. using images from slides that were excluded from the training set). The linear SVM was trained using the SVC function from the libsvm library, which is ensembled in the python library 'scikit-learn'.

By contrast, the supervised SCCNN used cell patches as inputs and predicted the cell classes directly.

Performance of all of the models was compared using the weighted F1-score calculated for the holdout set of testing images. The F1 score is the harmonic mean of the precision (true positives, TP, divided by TP+false positives, FP) and recall (TP divided by TP+false negatives, FN). The weighted F1-score is obtained by calculating the F1 score for each class and obtaining an average weighted by the number of true instances for each class:

$$\text{weighted F1} = \frac{1}{n} \sum\nolimits_{i=1}^{k} n_i * \frac{2TP}{2TP + FP + FN}$$

where n is the total number of instances, k is the number of classes, and $n_i$ is the number of instances for class i.

Results

Quality of Model Representations

Figure 6:
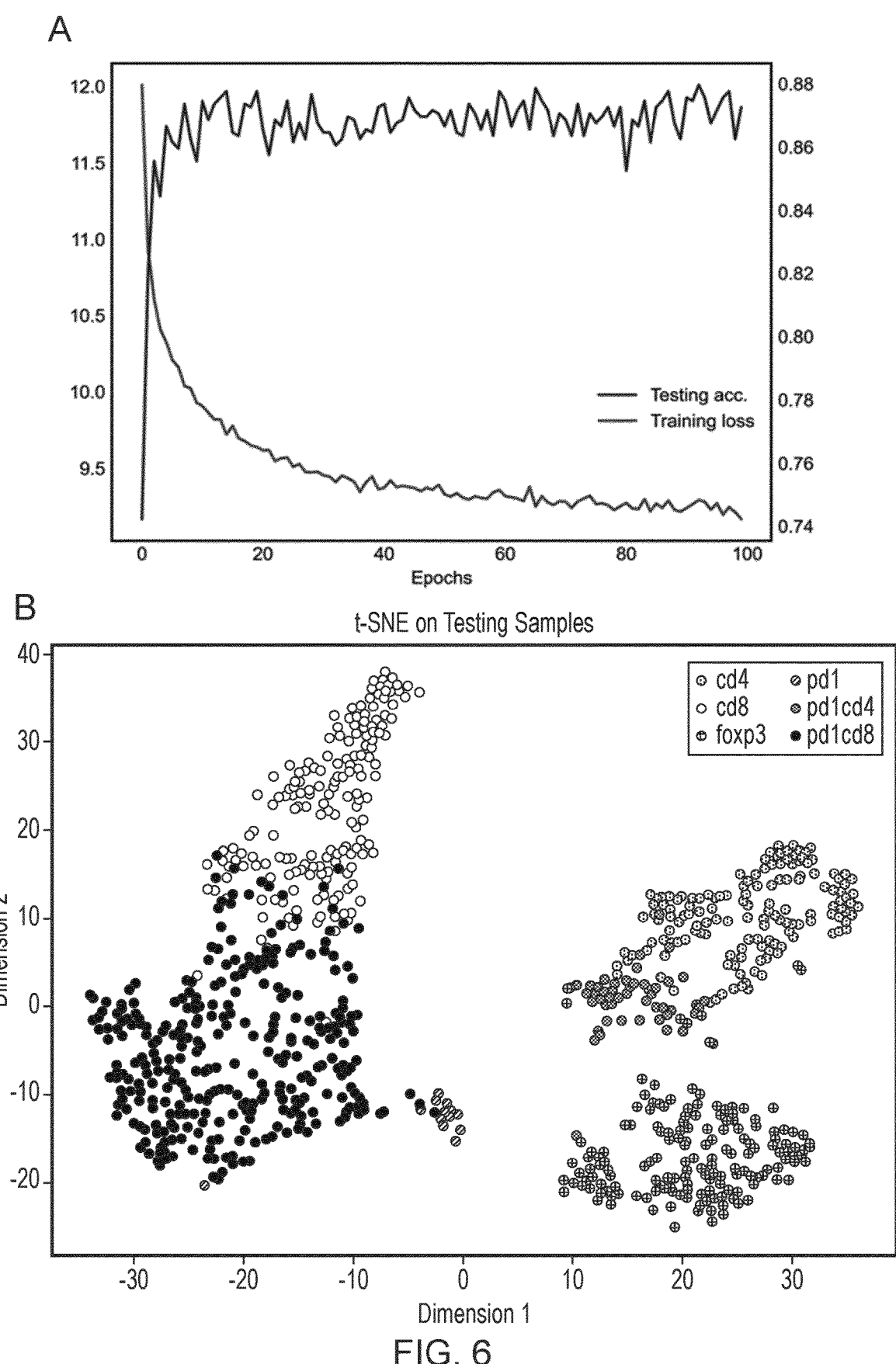
FIG. 6 shows the results of assessment of exemplary methods for analysing pathology samples. A. Training loss and testing accuracy across training epochs for the SANDI model trained on the Ovarian1 dataset. B. t-SNE representation of testing image embeddings for the SANDI model trained on the Ovarian1 dataset. Cell labels are represented as colour codes. C. tSNE plot of network embeddings from the SANDIsc model for a set of single cell sub-patches (each dot represents a single cell patch, i.e. it is based on the embedding of all 9 sub-patches from a single cell image, which is of length 9×32), coloured according to the (known) cell class. D. Cell classes and reference single cell patches used for the classification.
Figure 6:
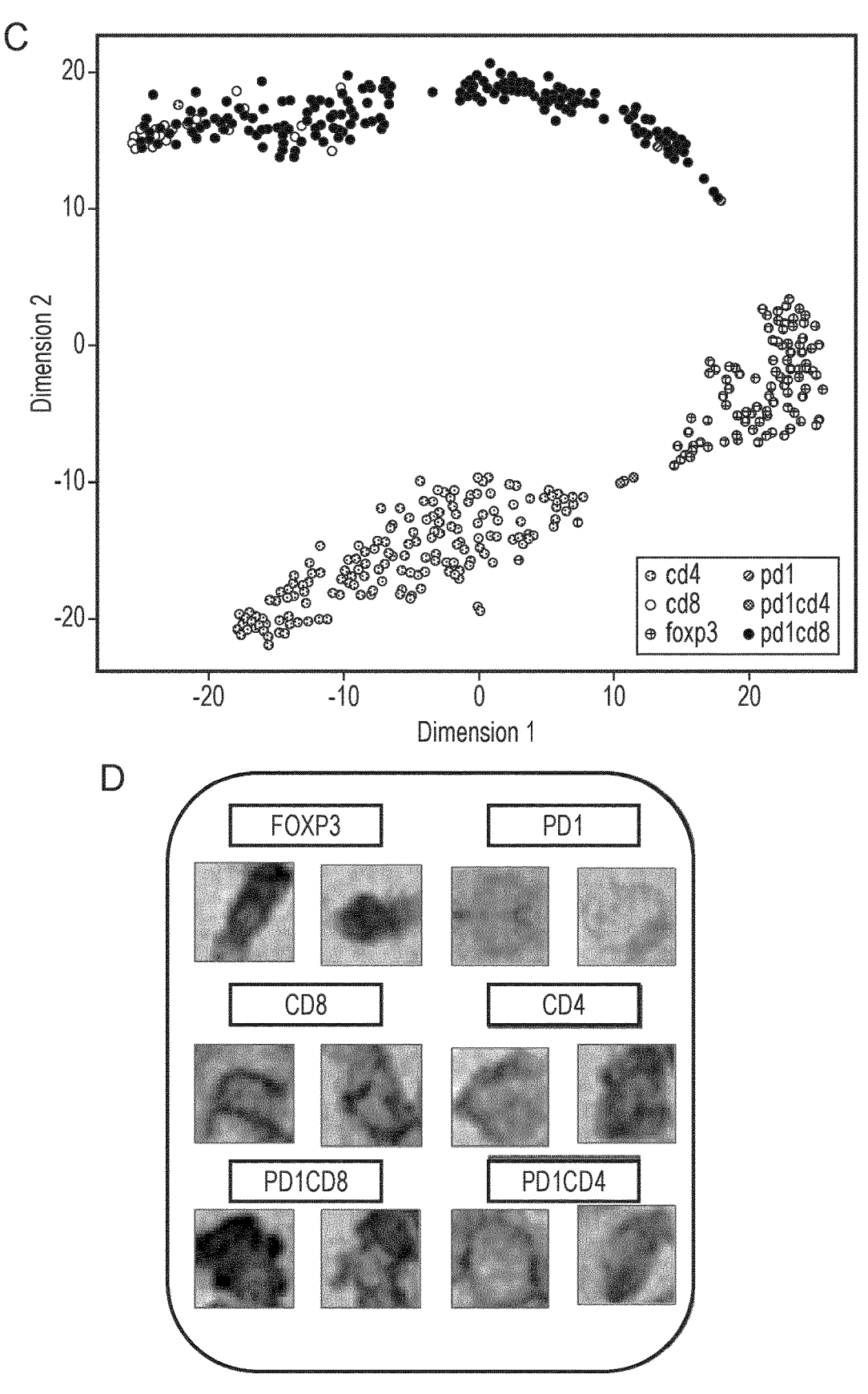

The quality of features learnt by SANDI was monitored at each training epoch using predictions from SVM classifier for the Ovarian1 dataset. As shown in FIG. 6A, the weighted F1-score on testing set steadily increased as the training loss decreased, indicating the consistency between the objective of self-supervised training and the classification performance. The effectiveness of SANDI in discriminating diverse cell types was further evaluated by visualizing the embeddings of testing images from the Ovarian1 dataset in the latent space, which was performed using the t-distributed stochastic neighbour embedding (t-SNE). As shown on FIG. 6B, the testing image embeddings from nine sub-patches revealed compact and distinguishable clusters corresponding to each cell type, suggesting that the model has captured discriminative features for different cell classes.

The same process was applied to the SANDIsc model. FIG. 6C shows a tSNE (t-distributed stochastic network embedding) plot of network embeddings from the SANDIsc model for a set of sub-patches (each dot represents a single cell sub-patch), coloured according to the (known) cell class, in the ovarian1 dataset. TSNE is a dimensionality reduction technique commonly used for visualisation of high-dimensional data such as neural network embeddings. The plot shows that the embeddings produced by the trained encoders for the foxp3, cd4 and pd1 cells are separated with just the first two dimensions of the tSNE plot. The classification accuracy (see below) indicates that the embeddings also contained sufficient information to separate the other classes.

Classification Performance of the SANDIsc Model

To evaluate the limitations of the self-supervised SANDIsc, the inventors compared it against a weakly supervised version of the pipeline (controlled SANDIsc) and a fully supervised SCCNN model. The weighted F1-scores evaluated on testing samples from 4 different datasets are shown in Table 3.

In general, the controlled SANDIsc (trained on explicit positive and negative samples) outperformed the self-supervised SANDIsc model (trained on completely random negative samples) and performed even better than the supervised model in two datasets (see Table 3). This suggested that the transition from pair-wise similarity to multi-class classification is impeded by the uncertainty in relation to negative samples (i.e. the fact that some negative pairs may comprise sub-patches that originate from different cells from the same class). This problem can be mitigated by adjusting the weights in the loss function to reduce the influence of the negative pairs. However, there is a balance in this regard since a more skewed weight ratio for positive and negative pairs may increase the risk of impeding the model's ability to differentiate between true negative pairs. In this context, the most appropriate ratio may depend on the data. For example, when ratios of 6:4, 7:3, 8:2 and 1:1, were tested, a model with ratio 7:3 was found to be superior to 1:1 in 4 datasets except for the Ovarian1 dataset. Thus, the weights in the loss function may in practice be beneficially adjusted depending on the type of data to be analysed.

TABLE 3

Performance comparison among self-supervised, weakly supervised and supervised learning. SANDIsc and the controlled SANDIsc were evaluated on 30% of the testing samples. Results of the supervised SCCNN classifier for the ER− breast dataset wastaken from [17].

| Dataset | Total no. of annotations for training the supervised SCCNN | Total no. of sub patches used to train the SANDIsc | Test size | Weighted F1-score | | |
| | | | | SANDIsc | Controlled SANDIsc | Supervised SCCNN |
| --- | --- | --- | --- | --- | --- | --- |
| Ovarian1 | 1322 cells | 30000 pairs | 506 cells | 0.931 | 0.944 | 0.923 |
| Ovarian1 | 870 cells | 10000 pairs | 739 cells | 0.973 | 0.987 | 0.998 |
| ER− breast | 20477 cells | 40000 pairs | 2451 cells | 0.745 | 0.774 | 0.965 |

Figure 7:
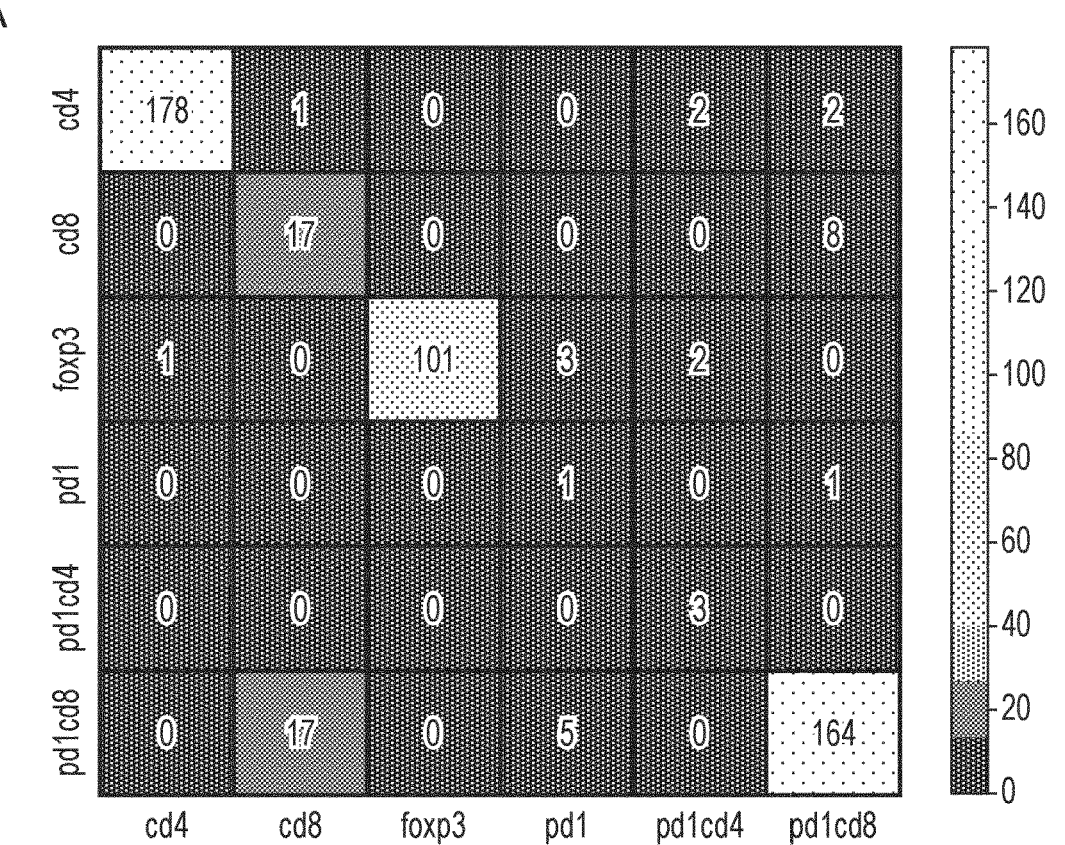
FIG. 7 shows the results of assessment of an exemplary method for analysing pathology samples. Results are shown for the SANDIsc model. A. Confusion matrix for a testing slide. B. Example of cell predictions on a magnified region of an exemplary multiplex histoimmunochemistry (mHIC) slide.
Figure 7:
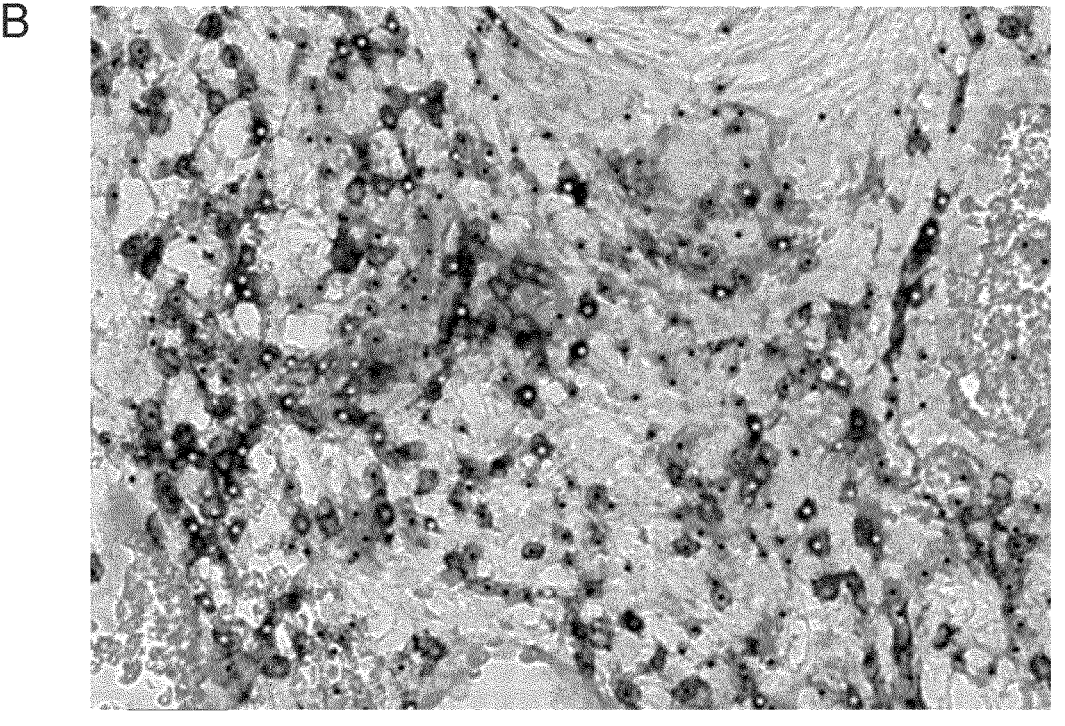

Further, as can be seen on FIG. 7A, which shows a confusion matrix of model predictions from the SANDIsc model for the Ovarian1 data, the excellent accuracy applied to all of the individual classes, even when a marker is present in more than one class (due to classes being associated with combinations of markers). An example output of the pipeline for an image from the Ovarian1 data set is shown on FIG. 7B. The output comprises an annotated image where the centre of each cell is marked with a dot coloured according to the predicted cell class.

Classification Based on Similarity Scores

As mentioned above, the SANDIsc model classifies a query cell based on pair-wise similarities with a set of reference images, which were selected manually as representatives of each subtype. The inventors evaluated three approaches for integrating sub-patch classification into patch classification in the SANDIsc model. All methods were evaluated using the same reference set and testing set. The results of this analysis are provided in Table 4.

The Maximum score-based method compares all sub-patches and uses the maximum similarity score thus obtained as the similarity score between two cell images. Thus, this method could be considered to "excessively" compare all sub-patches to determine the maximum similarity score between two cell images. Such a method was expected to relatively robust to the location of cell centre. The inventors found that this approach yielded a prediction accuracy lower than the centre-based and pair-wise distance methods in all of the 3 datasets (Table 4). The inventors believe that the error likely resulted from the inclusion of neighbouring cells at the corner of single cell patches, which may have higher similarity with another cell type different from the one of the target images.

The centre-based method only compares the central sub-patches of the query and reference images, respectively. This is the simplest and most computationally efficient one of the methods tested. The pair-wise distance method compares each reference image to every other reference image (using every combination of sub-patches), generating a set of similarity scores for each comparison. The same process is applied to a query image (which is compared against all reference images). Then, the L1 distances between (i) the set of similarity scores calculated by comparing the query image and each reference, and (ii) each of the set of similarity scores calculated by comparing a reference image to the other reference images are calculated. The query image is then assigned to the cell class of the reference image for which this L1 distance was minimal. This is the most complex and computationally intensive one of the methods tested. In the present data, the performance of the centre-based method was comparable to the pair-wise distance method, indicating that cell classes were discriminable using only features from the central sub-patch, and additional information from peripheral sub-patch did not always add benefits (Table 4).

TABLE 4

| | Weighted F1-score on testing samples for similarity score-based classification. | | | | |
| --- | --- | --- | --- | --- | --- |
| Dataset | Reference size (no. of cells) | Test size | Maximum | Central | Pair-wise distance |
| Ovarian1 | 15 cells 6 types | 506 cells | 0.853 | 0.914 | 0.905 |

TABLE 4-continued

| | Weighted F1-score on testing samples for similarity score-based classification. | | | | |
| --- | --- | --- | --- | --- | --- |
| Dataset | Reference size (no. of cells) | Test size | Maximum | Central | Pair-wise distance |
| Ovarian2 | 5 cells/type * 2 types | 739 cells | 0.826 | 0.923 | 0.927 |
| ER– breast | 2 cells/type * 5 types | 1749 cells | 0.589 | 0.627 | 0.623 |

Classification Performance of the Reference-Based Classification with Different Size of Randomly Selected Reference Set To access the size of reference set required for SANDI to achieve considerable performance, the inventors first trained linear SVM classifiers on feature embeddings of randomly sampled training subsets containing 1%, 3%, 5%, 10%, 20% and 30% of annotated samples of each cell type. The training of SVM was repeated for five times on different randomly sampled training sets and the mean weighted F1-scores were reported on hold-out testing set containing cells from slides excluded from training. The results compare the performance of SVM trained on the entire training set, the state-of-the-art method using the supervised SCCNN classifier with its structure proposed in, and a supervised classifier trained on 10%, 20%, 30% and 100% of annotations data (as explained above).

Due to data accessibility and arrangement of experiments, results of the supervised SCCNN classifier were generated by different training settings or taken from previous studies where the single-cell classification of the specific dataset was first proposed [17]. For the Ovarian1 and Ovarian2 datasets, the supervised SCCNN classifier was trained on the same dataset of SANDI with a different training/validation split, and evaluated on the same testing set. Results for the ER– breast dataset was taken from [17], which were generated by two cascading classifiers, with the first one to separate Gal+pSTAT+ cells from CD8+ and Gal+pSTAT– cells, and the second one to classify Gal+pSTATStrong, Gal+pSTATModerate and Gal+pSTATWeak cells. The model was trained on the same dataset with the split of training/validation/testing different from SANDI. It is worth noting that the performance of supervised SCCNN on ER– breast dataset is not reliable for direct comparison due to the difference in dataset split and training settings. However, they can serve as performance estimation for supervised classifiers specifically modified for each dataset.

The weighted F1-score of SANDI with a linear SVM classifier trained on various percentages of annotations data from each of the 3 datasets are reported in Table 5. Bold values highlight the best score at the given training set (percentage of annotations).

TABLE 5

Weighted F1-score of SVM classification on testing samples
with different percentages of annotation. All results
are the average over 5 trials with different random
seeds. Results of the supervised SCCNN classifier for
the ER- breast dataset was taken from [17].

| Labelled data | 1% | 3% | 5% | 10% | 20% | 30% | 100% |
|---|---|---|---|---|---|---|---|
| | | | Ovarian1 dataset | | | | |
| Supervised SCCNN | — | — | — | — | — | — | 0.844 |
| Supervised classifier | — | — | — | 0.750 | 0.806 | 0.830 | 0.858 |
| SANDI | 0.820 | 0.817 | 0.829 | 0.845 | 0.853 | 0.849 | 0.846 |
| | | | Ovarian2 dataset | | | | |
| Supervised SCCNN | — | — | — | — | — | — | 0.919 |
| Supervised classifier | — | — | — | 0.736 | 0.835 | 0.859 | 0.826 |
| SANDI | 0.855 | 0.829 | 0.847 | 0.840 | 0.844 | 0.854 | 0.869 |
| | | | ER- breast dataset | | | | |
| Supervised SCCNN | — | — | — | — | — | — | 0.965 |
| Supervised classifier | — | — | — | 0.645 | 0.649 | 0.720 | 0.854 |
| SANDI | 0.645 | 0.692 | 0.709 | 0.724 | 0.726 | 0.730 | 0.752 |

As can be seen from Table 5, with a budget of 10% and 20% of annotation data, the SANDI model outperformed the supervised classifier for all three datasets. When the size of reference set was limited to 1%, 3% and 5% of annotations, SANDI still achieved higher or comparable weighted F1-score to the supervised model trained on 10% of annotations. Thus, SANDI can obtain an adequate classification accuracy with 10 times fewer annotations than the conventional supervised training methods. When the annotation budget increased to 30% and 100%, SANDI was outperformed by the supervised classifier. Furthermore, as more annotations were presented to SANDI for the Ovarian1, and Ovarian2 datasets, the F1-score did not linearly improve. The adverse impact of a larger training set on classification accuracy is potentially due to poor-quality data being drawn during the random sampling process. This is consistent with the notion that discarding outliers in the training set of SVM was found to boost the classification performance with a notable margin [20]. Thus, such performance deterioration caused by noise in the data may be resolved by refining a high-quality training set, for example by carefully selecting a set of reference images for each cell class by manual curation and/or automatic expansion as explained below.

When compared to the supervised SCCNN classifier, the F1-score margin for SVM trained on 100% of annotations was smaller than 5% for two out of three datasets. Whereas for the ER– breast dataset, the weighted F1-score of SANDI is 10% lower than that of the supervised classifier trained on the same training set, and 20% lower than the supervised model reported in [17]. The accuracy gap may relate to the fact that cell types Gal+pSTATStrong, Gal+pSTATModerate and Gal+pSTATWeak are distinguished based on stain intensities of the pSTAT marker, which is empirically estimated by visualization. It was proposed by that even the supervised classifier was unable to discriminate among the three types of pSTAT expressing cells at desirable accuracy when they were mixed with CD8+ and GAL+pSTAT– cells during training. For this reason, the supervised classifier from [17] was trained in a cascading manner with the sample size of each cell type within a batch being balanced. Such manipulation of the training set potentially explains the superior performance, but is inapplicable for the self-supervised training of SANDI where cell labels are completely unknown (where the cell labels being unknown is inherent to the self-supervised approach which is one of the benefits of the approach). In other words, even fully supervised methods may only poorly perform when classifying cell populations that are distinguished by staining intensities, and any modest improvement compared to the approach described herein comes at a very high cost in terms of annotation burden, which is almost completely avoided with the approaches described herein.

Another factor impeding the SANDI performance is the uncertainty in negative labels arising from the random pairing of cell images. The mislabelling of cell images from the same cell populations as negative pairs can potentially bias the model towards features that can further distant cell images from the same class. To reduce the negative impact of uncertainty in image pairing while retaining the discrimination between negative pairs, the inventors set the weights for positive and negative pairs to a ratio of 7:3 in the loss function. A comparison between model performance with the ratio of weights set to 7:3 and 1:1 is shown in Table 6. It can be observed that SANDI with $L_{combined}$ and a weight ratio of 7:3 outperforms SANDI with $L_{combined}$ and a weight ratio of 1:1, and SANDI with only $L_{wbce}$ Or $L_{NT\text{-}XEnt}$ as loss function in 2 out of 3 datasets.

TABLE 6

Weighted F1-score of linear SVM classification for models
trained with different loss functions. The SVM classifier
was trained on embeddings from the entire training dataset
and validated on hold-out testing samples.

| Loss function | $L_{wbce}$ (7:3) | $L_{NT\text{-}XEnt}$ | $L_{combined}$ (7:3) | $L_{combined}$ (1:1) |
|---|---|---|---|---|
| Ovarian1 | 0.855 | 0.849 | 0.846 | 0.874 |
| Ovarian2 | 0.841 | 0.866 | 0.869 | 0.839 |
| ER– breast | 0.689 | 0.745 | 0.752 | 0.750 |

Overall, SANDI appears to be less sensitive to differences in staining intensities as compared to differences in colour combinations. In other words, SANDI is expected to perform particularly well in situations where cell populations are associated with distinct labels or combinations of labels, rather than different staining intensities of the same combinations of labels. Of note, such situations are preferable wherever possible anyway as identification of cellular population based on staining intensities are believed to noisy and unreliable even when performed by trained experts or using fully supervised methods derived from such extensively annotated datasets. The capability of SANDI in differentiating marker expression levels may be improved by coupling with data pre-processing steps such as k-means clustering that reduce the chance of mislabelling cell images from the same cell population as negative pairs.

Classification Performance With Automatic Expanding Reference Set

Although SANDI is able to obtain a considerable accuracy with a limited amount of labels, the classifier trained on a small set of representatives may underestimate the intracell-type variations in stain intensities, colour combinations and morphologies. By contrast, a larger training set can expose the model to higher variability in the data, but can also deteriorate model performance if poor-quality data are included. An ideal approach to capture a good level of variation while ensuring adequate data quality may be to leverage information learnt by self-supervised training to inform the pathologist of cells that are prone to misclassification and thereby, creating ground truth feedback to improve model performance. For this purpose, the inventors proposed an automatic expansion method (as explained above) for iteratively adding human interpretation of least confident instances as training events.

Figure 9:
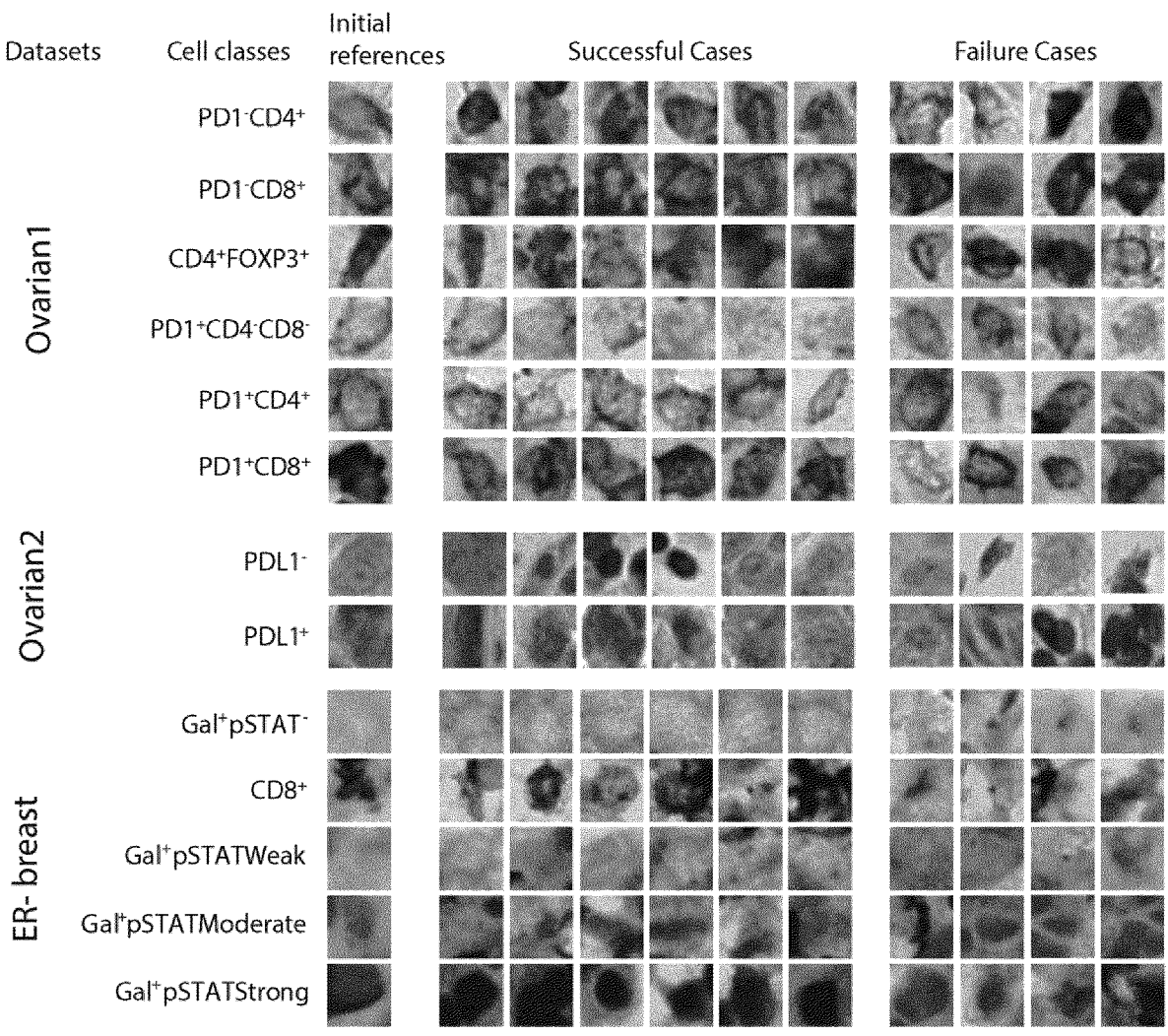
FIG. 9 illustrates an example of the results of an automatic expansion of reference set. The figure shows initial references used for automatic expansion of the reference set and examples of cells classified by the linear SVM classifier trained on reference set selected at the $10^{th}$ iteration.

The reference set was initialized with one arbitrarily selected image for each cell type (see FIG. 9). Images from the training dataset of SANDI and the reference set were processed by the trained feature encoder into feature vectors. For each query image, the Manhattan distance between its embeddings and embeddings of each reference image was computed to determine its class. For the set of images assigned to each cell type, the instance with the maximum Manhattan distance is selected for manual labelling. Labelled instances are then mixed with references from the previous round to form the new reference set. This iteration was repeated for 10 rounds and the weighted F1-score of the linear SVM classifier trained on reference set from each round was reported on a constant hold-out testing set (Table 7). Examples of cells classified by the linear SVM classifier trained on reference set at the $10^{th}$ iteration are shown on FIG. 9.

TABLE 7

Weighted F1-score on testing set for the linear SVM classifier trained on reference set generated from each round of automatic expansion of reference set. Bold values are within 0.005 below the best.

| Data-sets | Rounds | 0 | 1 | 2 | 3 | 4 | 5 |
|---|---|---|---|---|---|---|---|
| Ovar-ian1 | Ref. Size | 6 | 12 | 18 | 24 | 30 | 36 |
| | Weighted F1-score | 0.758 | 0.903 | 0.878 | 0.866 | 0.878 | 0.873 |
| Ovar-ian2 | Ref. Size | 2 | 4 | 6 | 8 | 10 | 12 |
| | Weighted F1-score | 0.914 | 0.913 | 0.852 | 0.886 | 0.945 | 0.926 |
| ER-breast | Ref. Size | 5 | 10 | 15 | 20 | 25 | 30 |
| | Weighted F1-score | 0.760 | 0.719 | 0.752 | 0.721 | 0.712 | 0.771 |

TABLE 7

Weighted F1-score on testing set for the linear SVM classifier trained on reference set generated from each round of automatic expansion of reference set.

| Data-sets | Rounds | 6 | 7 | 8 | 9 | 10 |
|---|---|---|---|---|---|---|
| Ovar-ian1 | Ref. Size | 42 | 48 | 54 | 60 | 66 |
| | Weighted F1-score | 0.889 | 0.894 | 0.891 | 0.892 | 0.896 |
| Ovar-ian2 | Ref. Size | 14 | 16 | 18 | 20 | 22 |
| | Weighted F1-score | 0.9284 | 0.9279 | 0.9016 | 0.8941 | 0.8941 |
| ER-breast | Ref. Size | 35 | 40 | 45 | 50 | 55 |
| | Weighted F1-score | 0.787 | 0.791 | 0.791 | 0.779 | 0.782 |

As shown in Table 7, the improvement of weighted F1-score is unsteady as the number of references increases, with the value peaking before the $10^{th}$ round. The decrease in accuracy is potentially due to references found near the decision boundary, which might have mixed-class neighbours and thus cause confusion between cell classes that are not well-separated in the latent space. Despite the variation in testing accuracy, models trained on automatic expanding reference sets at round 10 outperforms the ones trained on 20% randomly sampled annotations with a notable margin (see Tables 6 and 7). This indicates that selecting training samples based on classification uncertainty predicted by the feature encoder pre-trained on self-supervised task can effectively boost the classification accuracy with minimal annotations required.

Dealing With Over-Identification of Single Cell Patches

Figure 10:
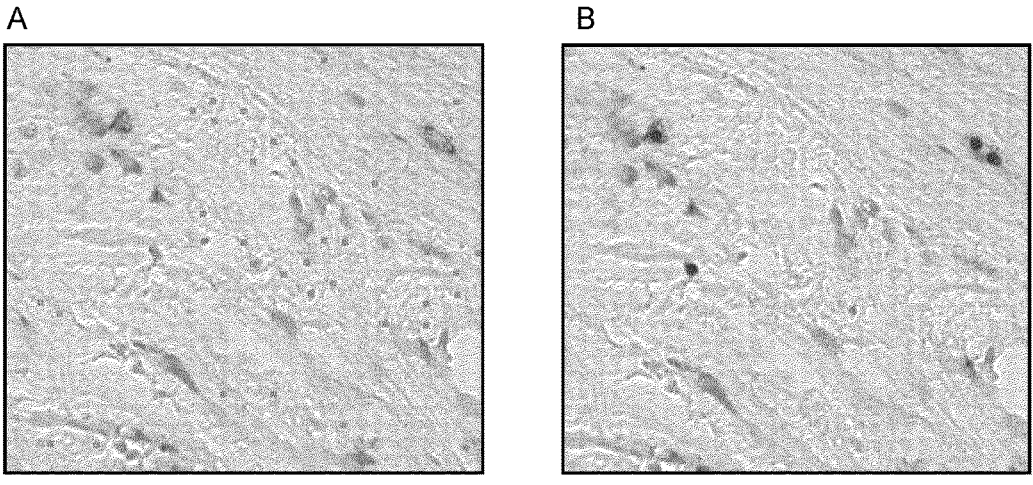
FIG. 10 shows an exemplary input to a model trained to identify single cells according to the present disclosure (A, C), and the corresponding output of the trained model (B, D). A, C. A deep learning algorithm trained to detect single cells was used to locate single cell patches (indicated as overlaid dots on the image). Theses single cell patches were used as input to models (SANDIsc and SANDI) for classifying single cells between a plurality of cell types, as described herein. The output of the SANDIsc model for the input shown in A is shown in B, where classified cells are indicated as overlaid dots on the image, and background signal erroneously identified in A is classified as background and ignored. The output of the SANDI model for the input shown in C is shown in D, where classified cells are indicated as overlaid dots on the image, and background signal erroneously identified in C is classified as background and ignored.
Figure 10:
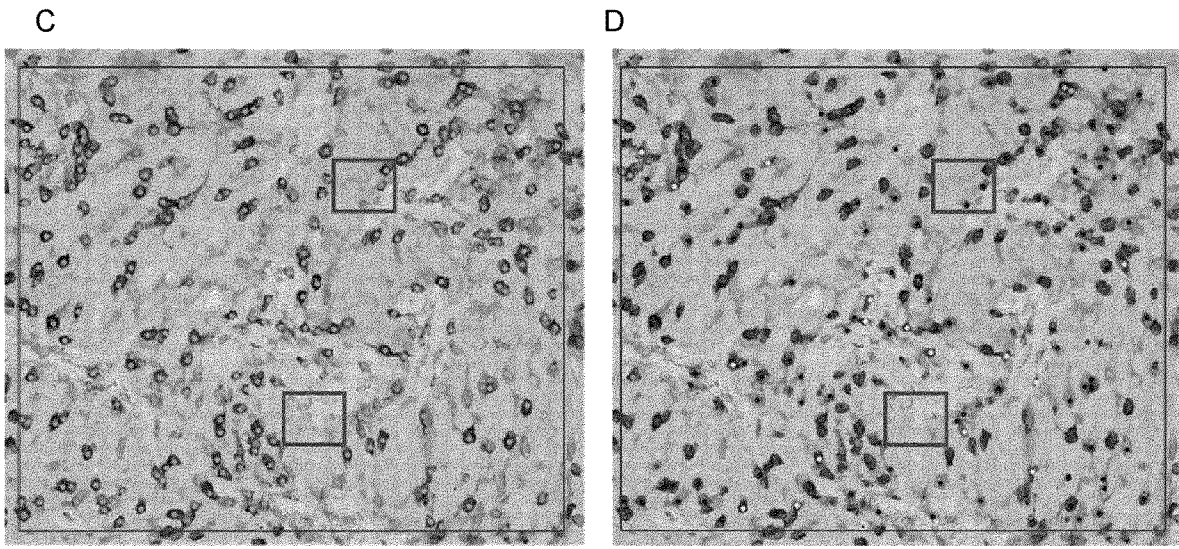

Machine learning algorithms trained to detect single cells in pathology images frequently suffer from the problem over "over-identification", where background signal is erroneously interpreted as indicating the presence of cells. This is illustrated in FIG. 10A, where the method in was used to identify single cells marked by overlaid dots. In order to test the ability of the present methods to deal with such problems, when the output of such methods is used to obtain single cell patches used as input to the present method, the inventors included an additional cell type class for empty (or 'background') patches with corresponding reference images, in the SANDIsc model. An exemplary result is shown on FIG. 10B, which shows an output of the present method, with classified single cells marked by overlaid dots, and patches classified as "background" not included in the annotation. As can be seen on FIG. 10B, the wrongly identified single cell patches were effectively identified as background and removed by SANDIsc.

The capacity of SANDI was further examined on 4431 unlabelled cells from 19 regions on 4 Ovarian1 slides which were auto-detected by a pre-trained neural network [12]. It is worth noting that the auto-detected dataset contains tissue backgrounds that were over-detected as stained cells (see FIG. 10C). Despite such noise within the data, SANDI trained on this dataset achieved a weighted F1-score of 0.855 with the linear SVM classifier trained on 20% random selected training samples of the Ovarian1 dataset and evaluated on the same testing set as previously described, suggesting its robustness against incorrect detection of cells. Additionally, SANDI was also capable of correcting over-detected regions using patches of tissue background as references (see FIG. 10D).

CONCLUSION

The work in these examples demonstrate a new approach for single cell classification on multiplex slides based on the self-supervised learning. By employing the prediction of pair-wise similarity as the pretext task, the model leveraged intrinsic information from unlabelled data to facilitate the cell classification. The experiment results demonstrated the effectiveness of the proposed pipeline for different combinations of stains, with minimal number of human annotations required.

REFERENCES

[1] I. Tirosh et al., "Dissecting the multicellular ecosystem of metastatic melanoma by single-cell RNA-seq," Science (80-), vol. 352, no. 6282, pp. 189-196, April 2016.

[2] G. Bindea et al., "Spatiotemporal dynamics of intratumoral immune cells reveal the immune landscape in human cancer," Immunity, vol. 39, no. 4, pp. 782-795, October 2013.

[3] D. Tamborero et al., "A pan-cancer landscape of interactions between solid tumors and infiltrating immune cell populations," Clin. Cancer Res., vol. 24, no. 15, pp. 3717-3728, August 2018.

[4] J. Galon et al., "Type, density, and location of immune cells within human colorectal tumors predict clinical outcome," *Science* (80-), vol. 313. no. 5795, pp. 1960-1964, September 2006.

[5] W. C. C. Tan et al., "Overview of multiplex immunohistochemistry/immunofluorescence techniques in the era of cancer immunotherapy," *Cancer Communications*, vol. 40, no. 4. John Wiley and Sons Inc., pp. 135-153, 1 Apr. 2020.

[6] C. Giesen et al., "Highly multiplexed imaging of tumor tissues with subcellular resolution by mass cytometry," *Nat. Methods*, vol. 11, no. 4, pp. 417-422, 2014.

[7] M. J. Gerdes et al., "Highly multiplexed single-cell analysis of formalin-fixed, paraffin-embedded cancer tissue," *Proc. Natl. Acad. Sci.*, vol. 110, no. 29, pp. 11982 LP-11987, July 2013.

[8] C. Life Sciences, "Nuance MULTISPECTRAL IMAGING SYSTEM User's Manual for Nuance 3.0.2."

[9] P. Bankhead et al., "QuPath: Open source software for digital pathology image analysis," *Sci. Rep.*, vol. 7, no. 1, December 2017.

[10] S. Abousamra et al., "Weakly-Supervised Deep Stain Decomposition for Multiplex IHC Images," in *Proceedings—International Symposium on Biomedical Imaging*, 2020, vol. 2020-April, pp. 481-485.

[11] K. AbdulJabbar et al., "Geospatial immune variability illuminates differential evolution of lung adenocarcinoma," *Nat. Med.*, pp. 1-9, May 2020.

[12] K. Sirinukunwattana, S. E. A. Raza, Y. W. Tsang, D. R. J. Snead, I. A. Cree, and N. M. Rajpoot, "Locality Sensitive Deep Learning for Detection and Classification of Nuclei in Routine Colon Cancer Histology Images," *IEEE Trans. Med. Imaging*, vol. 35, no. 5, pp. 1196-1206, May 2016.

[13] J. Bromley et al., "Signature Verification using a 'Siamese' Time Delay Neural Network."

[14] P. L. Narayanan et al., "Unmasking the tissue microecology of ductal carcinoma in situ with deep learning," bioRxiv, p. 812735, October 2019.

[15] S. E. A. Raza et al., "Deconvolving convolutional neural network for cell detection," in *Proceedings—International Symposium on Biomedical Imaging*, 2019, vol. 2019-April, pp. 891-894.

[16] Ma, Z., Shiao, S. L., Yoshida, E. J. et al. Data integration from pathology slides for quantitative imaging of multiple cell types within the tumor immune cell infiltrate. Diagn Pathol 12, 69 (2017).

[17] Y. B. Hagos, P. L. Narayanan, A. U. Akarca, T. Marafioti, and Y. Yuan, "ConCORDe-Net: Cell Count Regularized Convolutional Neural Network for Cell Detection in Multiplex Immunohistochemistry Images," Lect. Notes Comput. Sci. (including Subser. Lect. Notes Artif. Intell. Lect. Notes Bioinformatics), vol. 11764 LNCS, pp. 667-675, August 2019.

[18] T. Chen, S. Kornblith, M. Norouzi, and G. Hinton, "A Simple Framework for Contrastive Learning of Visual Representations," 2020.

[19] C.-C. Chang and C.-J. Lin, "LIBSVM: A Library for Support Vector Machines."

[20] J. Nalepa and M. Kawulok, "Selecting training sets for support vector machines: a review," *Artificial Intelligence Review.* 2019.

[21] P. Tsyurmasto, M. Zabarankin, and S. Uryasev, "Value-at-risk support vector machine: Stability to outliers," J. Comb. Optim., vol. 28, no. 1, pp. 218-232, July 2014.

[22] Fassler D J, Abousamra S, Gupta R, et al. Deep learning-based image analysis methods for brightfield-acquired multiplex immunohistochemistry images. Diagn *Pathol.* 2020; 15(1): 100.

All references cited herein are incorporated herein by reference in their entirety and for all purposes to the same extent as if each individual publication or patent or patent application was specifically and individually indicated to be incorporated by reference in its entirety.

The specific embodiments described herein are offered by way of example, not by way of limitation. Various modifications and variations of the described compositions, methods, and uses of the technology will be apparent to those skilled in the art without departing from the scope and spirit of the technology as described. Any sub-titles herein are included for convenience only, and are not to be construed as limiting the disclosure in any way.

The methods of any embodiments described herein may be provided as computer programs or as computer program products or computer readable media carrying a computer program which is arranged, when run on a computer, to perform the method(s) described above.

Unless context dictates otherwise, the descriptions and definitions of the features set out above are not limited to any particular aspect or embodiment of the invention and apply equally to all aspects and embodiments which are described.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

Other aspects and embodiments of the invention provide the aspects and embodiments described above with the term "comprising" replaced by the term "consisting of" or "consisting essentially of", unless the context dictates otherwise.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

The invention claimed is:

1. A method of analysing the cellular composition of a sample, the method comprising:

providing, to a processor, an image of the sample, wherein the sample is a stained pathology sample comprising a plurality of cellular populations;

classifying, by said processor, a plurality of query cells in the image between a plurality of classes comprising one or more classes corresponding to respective cellular populations in the plurality of cellular populations, by, for each query cell:

providing a query single cell image to an encoder module of a machine learning model to produce a feature vector for the query image, wherein the machine leaning model comprises:

the encoder module, wherein the encoder module is configured to take as input a single cell image and to produce as output a feature vector the single cell image, and a similarity module configured to take as input a pair of feature vectors for a pair of single cell images and to produce as output a score indicative of the similarity between the single cell images, assigning the query cell to one of the plurality of classes based on the feature vector for the query single cell image and feature vectors produced by the encoder module for each of a plurality of reference single cell images comprising at least one reference single cell image for each of the plurality of cellular populations.

2. The method of claim 1, wherein the machine learning model has been trained to take as input a pair of sub-patches of single cell images and to produce as output a score indicative of the similarity between the sub-patches of single cell images, and to associate a first label and/or a high score to positive pairs of sub-patches of single cell images and a second label and/or a low score to negative pairs of sub-patches of single cell images, using a set of training single cell images comprising:

a plurality of positive pairs of single cell images that each show a sub-patch of the same cell, and a plurality of negative pairs of single cell images that each show a subpatch of a different cell, wherein the two images in a pair are different from each other.

3. The method of claim 2, wherein the set of training single cell images have been obtained by:

providing a plurality of single cell images;

obtaining a plurality of sub-patches from each single cell image, wherein a sub-patch is an image that comprises a portion of the single cell image; and obtaining a plurality of positive pairs of single cell images by pairing sub-patches from the same single cell image, and a plurality of negative pairs of single cell images by pairing sub-patches from different single cell images.

4. The method of claim 2, wherein the machine learning model has been trained using a loss function that weighs positive pairs more than negative pairs.

5. The method of claim 1, wherein assigning the query cell to one of the plurality of classes based on the feature vector for the query single cell image and feature vectors produced by the encoder module for each of a plurality of reference single cell images comprises:

providing the feature vector for the query image and the feature vectors for each the plurality of reference single cell images in turn to the similarity module, thereby obtaining a plurality of scores indicative of the similarity between the query single cell image and each of the respective reference single cell image; and assigning the query cell to one of the plurality of classes based on the plurality of scores, optionally wherein assigning the query cell to one of the plurality of classes based on the plurality of scores comprises assigning the query cell to the class that is associated with the reference single cell image that is predicted to be most similar to the query single cell image.

6. The method of claim 5, wherein assigning the query cell to one of the plurality of classes based on the plurality of scores comprises assigning the query cell to the class that is associated with the reference single cell image that is predicted to be most similar to the query single cell image, by quantifying a similarity metric quantified between the plurality of scores and each of corresponding pluralities of scores obtained for pairs of reference cell images and assigning the query cell to the class that is associated with the similarity metric indicative of highest similarity.

7. The method of claim 1, wherein classifying a query cell between a plurality of classes comprises obtaining a plurality of sub-patches from the query single cell image, wherein providing a query single cell image to the encoder module of the machine learning model comprises providing a one or more of the plurality of sub-patches from the query single cell image to the encoder module of the machine learning model, wherein the encoder module is configured to take as input a sub-patch of a single cell image and to produce as output a feature vector for the sub-patch of the single cell image, and the similarity module is configured to take as input a pair of feature vectors for a pair of sub-patches of single cell images and to produce as output a score indicative of the similarity between the sub-patches of single cell images; and wherein the feature vector for the query single cell image comprises feature vectors for the one or more sub-patches of the query single cell image and the feature vectors produced by the encoder module for each of a plurality of reference single cell images comprise feature vectors produced for one or more of a plurality of sub-patches from each reference single cell image.

8. The method of claim 7, wherein assigning the query cell to one of the plurality of classes based on the feature vector for the query image and feature vectors produced by the encoder module for each of a plurality of reference single cell images comprises:

for each distinct pair comprising a sub-patch from the query single cell image and a sub-patch from the reference single cell image, providing the feature vector for the sub-patch for the query image and the sub-patch from the reference single cell image to the similarity module;

wherein the score indicative of the similarity between the query single cell image and the respective reference single cell image comprises a score predicted by the machine learning model for each distinct pair, wherein assigning the query cell to one of the plurality of classes based on the plurality of scores comprises assigning the query cell to the class that is associated with the reference single cell image that comprises the sub-patch that was predicted to have the highest similarity with a sub-patch from the query single cell image.

9. The method of claim 7, wherein:

classifying a query cell between a plurality of classes comprises obtaining a representative sub-patch from the query single cell image, providing a sub-patch from the query single cell image to the encoder module of the machine learning model comprises providing the representative sub-patch from the query single cell image to the encoder module, the feature vectors produced by the encoder module for one or more sub-patches of each of a plurality of reference single cell images comprise feature vectors produced for a representative sub-patch from each reference single cell image, and assigning the query cell to one of the plurality of classes based on the plurality of scores comprises assigning the query cell to the class that is associated with the reference single cell image whose representative sub-patch was predicted to have the highest similarity with the representative sub-patch from the query single cell image, optionally wherein the respective representative sub-patches are the central sub-patches of the respective single cell images.

10. The method of claim 7, wherein assigning the query cell to one of the plurality of classes based on the feature vector for the query image and feature vectors produced by the encoder module for each of a plurality of reference single cell images comprises:

assigning the query cell to one of the plurality of classes using a classifier model trained to classify the feature vectors produced by the encoder module for sub-patches of each of the plurality of reference single cell images between classes corresponding to the plurality of cellular populations, wherein the feature vectors used by the classifier for each single cell image comprise feature vectors produced by the encoder module for each of the plurality of sub-patches for the single cell image.

11. The method of claim 1, wherein classifying at least a subset of the cells in the image comprises obtaining a plurality of query single cell images using a machine learning model trained to locate single cells in an image.

12. The method of claim 1, wherein the reference set of single cell images comprises between 1 and 5 reference single cell images for each of the plurality of cellular populations.

13. The method of claim 1, wherein the reference set of single cell images further comprises at least one image corresponding to background signal.

14. The method of claim 1, wherein the method comprises providing, to the processor, a reference set of single cell images and expanding the reference set of single cell images by:

providing an initial reference set of single cell images using the initial reference set of single cell images and the trained machine learning model to classify a plurality of query single cell images;

for each class of cells, selecting one or more query single cell images that are most dissimilar to any of the reference single cell images from the same class; and obtaining a label for each selected query single cell image including them in an updated reference set of single cell images.

15. The method of claim 1, wherein the machine learning model comprises a deep learning model, preferably a Siamese neural network.

16. The method of claim 1, wherein the image of the sample and any training images are immunohistochemistry or immunofluorescence images, or wherein each of the plurality of cellular population is associated with a respective label or combination of labels that is represented in the image.

17. The method of claim 1, further comprising determining one or more cellular composition metrics selected from: the amounts, ratios, proportions or spatial distribution of cells in the sample belonging to one or more of the plurality of cellular populations using the number of query cells assigned to the respective classes corresponding to the one or more of the plurality of cellular populations, and optionally determining a diagnostic and/or prognostic for a subject from whom the sample has been obtained using said one or more cellular composition metrics.

18. The method of claim 1, further comprising:

providing, to the processor, a plurality of training single cell images;

providing, to the processor, a machine learning model configured to take as input a pair of images and to produce as output a score indicative of the similarity between the images; and training, by the processor, the machine learning model to take as input a pair of single cell images or sub-patches thereof and to produce as output a score indicative of the similarity between the single cell images or sub-patches thereof, by training the machine learning model to associate a first label and/or a high score to positive pairs of training single cell images and a second label and/or a low score to negative pairs of training single cell images, wherein positive pairs comprise pairs of distinct single cell images or sub-patches thereof that each show at least a portion of the same cell (positive pairs), and negative pairs comprises pairs of distinct single cell images or sub-patches thereof that each show at least a portion of a different cell.

19. A system for analysing the cellular composition of a sample, the system comprising one or more processor and one or more computer readable medium/media comprising instructions that, when executed by the processor, cause the processor to perform a method comprising:

receiving, by the one or more processors, an image of the sample, wherein the sample is a stained pathology sample comprising a plurality of cellular populations;

classifying, by said processor, a plurality of query cells in the image between a plurality of classes comprising one or more classes corresponding to respective cellular populations in the plurality of cellular populations, by, for each query cell:

providing a query single cell image to an encoder module of a machine learning model to produce a feature vector for the query image, wherein the machine leaning model comprises:

the encoder module, wherein the encoder module is configured to take as input a single cell image and to produce as output a feature vector the single cell image, and a similarity module configured to take as input a pair of feature vectors for a pair of single cell images and to produce as output a score indicative of the similarity between the single cell images, assigning the query cell to one of the plurality of classes based on the feature vector for the query single cell image and feature vectors produced by the encoder module for each of a plurality of reference single cell images comprising at least one reference single cell image for each of the plurality of cellular populations.

20. One or more non-transitory computer readable media comprising instructions that, when executed by at least one processor, cause the at least one processor to perform a method comprising:

obtaining, by the at least one processor, a plurality of training single cell images from stained pathology samples;

obtaining, by the at least one processor a machine learning model configured to take as input a pair of images and to produce as output a score indicative of the similarity between the images; and training the machine learning model to take as input a pair of sub-patches of single cell images and to produce as output a score indicative of the similarity between the sub-patches of single cell images, by training the machine learning model to associate a first label and/or a high score to positive pairs of training single cell images and a second label and/or a low score to negative pairs of training single cell images, wherein positive pairs comprise pairs of distinct sub-patches of single cell images that each show at least a portion of the same cell (positive pairs), and negative pairs comprise pairs of distinct sub-patches of single cell images that each show at least a portion of a different cell.

\* \* \* \* \*